United States Patent
Tagami

(10) Patent No.: US 9,799,360 B2
(45) Date of Patent: Oct. 24, 2017

(54) MAGNETIC DISK DEVICE AND CORRECTION METHOD OF HEAD POSITION

(71) Applicant: Kabushiki Kaisha Toshiba, Minato-ku, Tokyo (JP)

(72) Inventor: Naoki Tagami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/267,892

(22) Filed: Sep. 16, 2016

(65) Prior Publication Data
US 2017/0263275 A1    Sep. 14, 2017

Related U.S. Application Data

(60) Provisional application No. 62/306,442, filed on Mar. 10, 2016.

(51) Int. Cl.
*G11B 5/596* (2006.01)
*G11B 20/12* (2006.01)

(52) U.S. Cl.
CPC .. *G11B 5/59627* (2013.01); *G11B 2020/1282* (2013.01)

(58) Field of Classification Search
CPC ....... G11B 5/02; G11B 5/596–5/59611; G11B 5/59627
USPC .................. 360/55, 60, 69, 75, 77.01–77.08
See application file for complete search history.

(56) References Cited

U.S. PATENT DOCUMENTS

| | | | | |
|---|---|---|---|---|
| 7,453,664 B2 * | 11/2008 | Kawabe | ............... | G11B 5/596 360/77.08 |
| 7,561,370 B2 * | 7/2009 | Melrose | ............. | G11B 5/59627 360/77.04 |
| 7,576,941 B1 * | 8/2009 | Chen | .................. | G11B 5/59627 360/77.04 |
| 7,595,955 B2 | 9/2009 | Hosono et al. | | |
| 7,787,209 B1 * | 8/2010 | Liikanen | ............ | G11B 5/59627 360/77.04 |
| 8,693,134 B1 * | 4/2014 | Xi | ...................... | G11B 5/59627 360/77.04 |
| 8,711,504 B1 * | 4/2014 | Everett | ................. | G11B 5/012 360/77.08 |
| 9,286,925 B1 * | 3/2016 | Shepherd | ........... | G11B 5/59627 |

(Continued)

OTHER PUBLICATIONS

Naoki Tagami, "Data Writing Method, Magnetic Disk Drive, and Method of Manufacturing Magnetic Disk Drive," U.S. Appl. No. 14/918,185, filed Oct. 20, 2015.

*Primary Examiner* — Wayne Young
*Assistant Examiner* — James L Habermehl
(74) *Attorney, Agent, or Firm* — David M. Tennant

(57) ABSTRACT

According to one embodiment, a magnetic disk drive in the present embodiment includes a disk including tracks, each including servo sectors, a head, and a controller configured to acquire first correction data for repeatable runout occurring in a first direction, and second correction data different from the first correction data, to write the first correction data within a first permitted range in the first direction, to write the second correction data within a write permitted range including the first permitted range and a second permitted range in a second direction opposite to the first direction, to read at least one of the first correction data and the second correction data, and to correctly place the head.

20 Claims, 14 Drawing Sheets

(56) References Cited

U.S. PATENT DOCUMENTS

| | | | |
|---|---|---|---|
| 9,343,094 B1 * | 5/2016 | Ma | G11B 5/59627 |
| 9,349,400 B1 * | 5/2016 | Dhanda | G11B 5/59627 |
| 9,502,062 B1 * | 11/2016 | Dorobantu | G11B 5/59627 |
| 2009/0244759 A1 | 10/2009 | Mori | |
| 2015/0055239 A1 | 2/2015 | Hara | |
| 2015/0302876 A1 * | 10/2015 | Kashiwagi | G11B 5/59627 360/77.04 |

* cited by examiner

F.I.G. 1

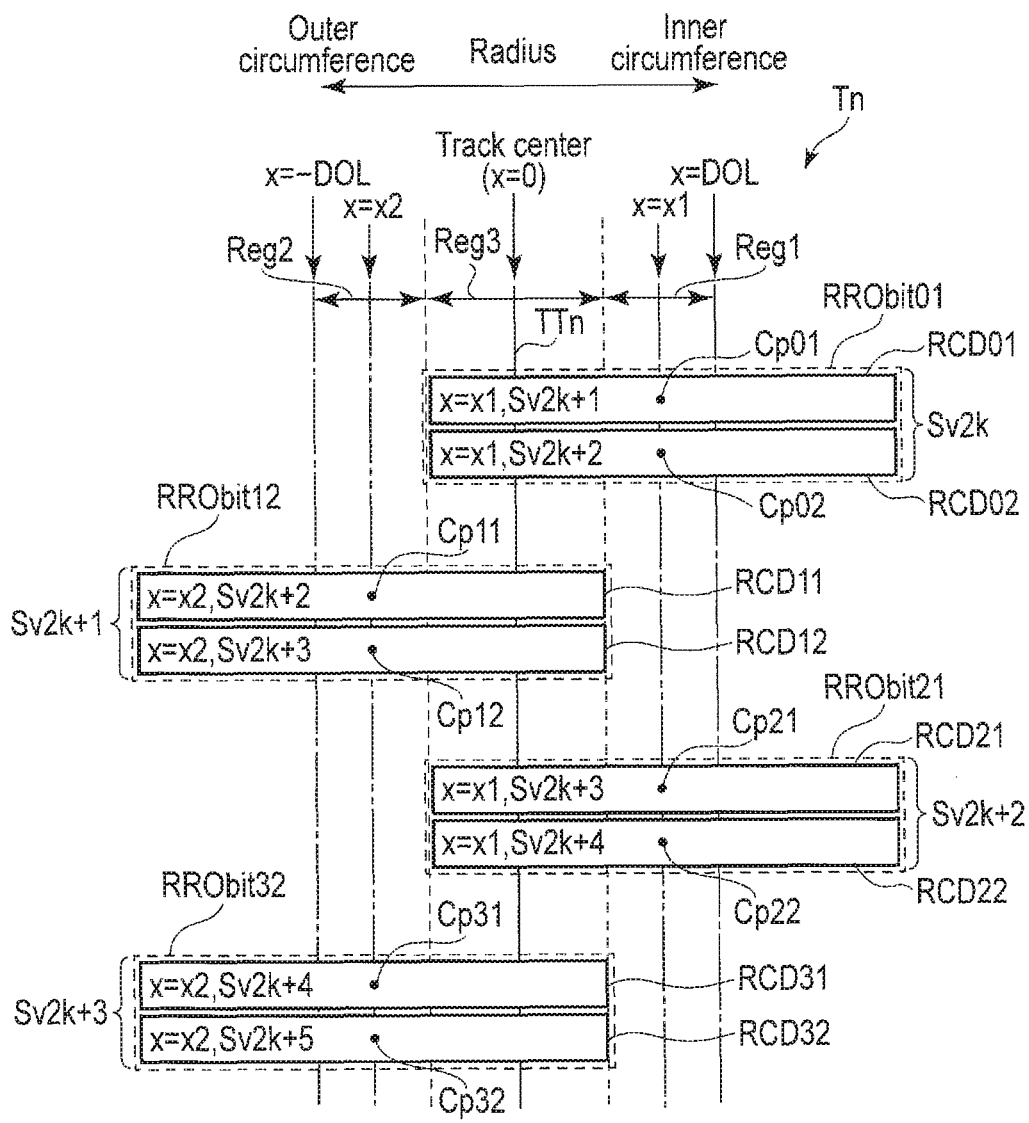
F I G. 6

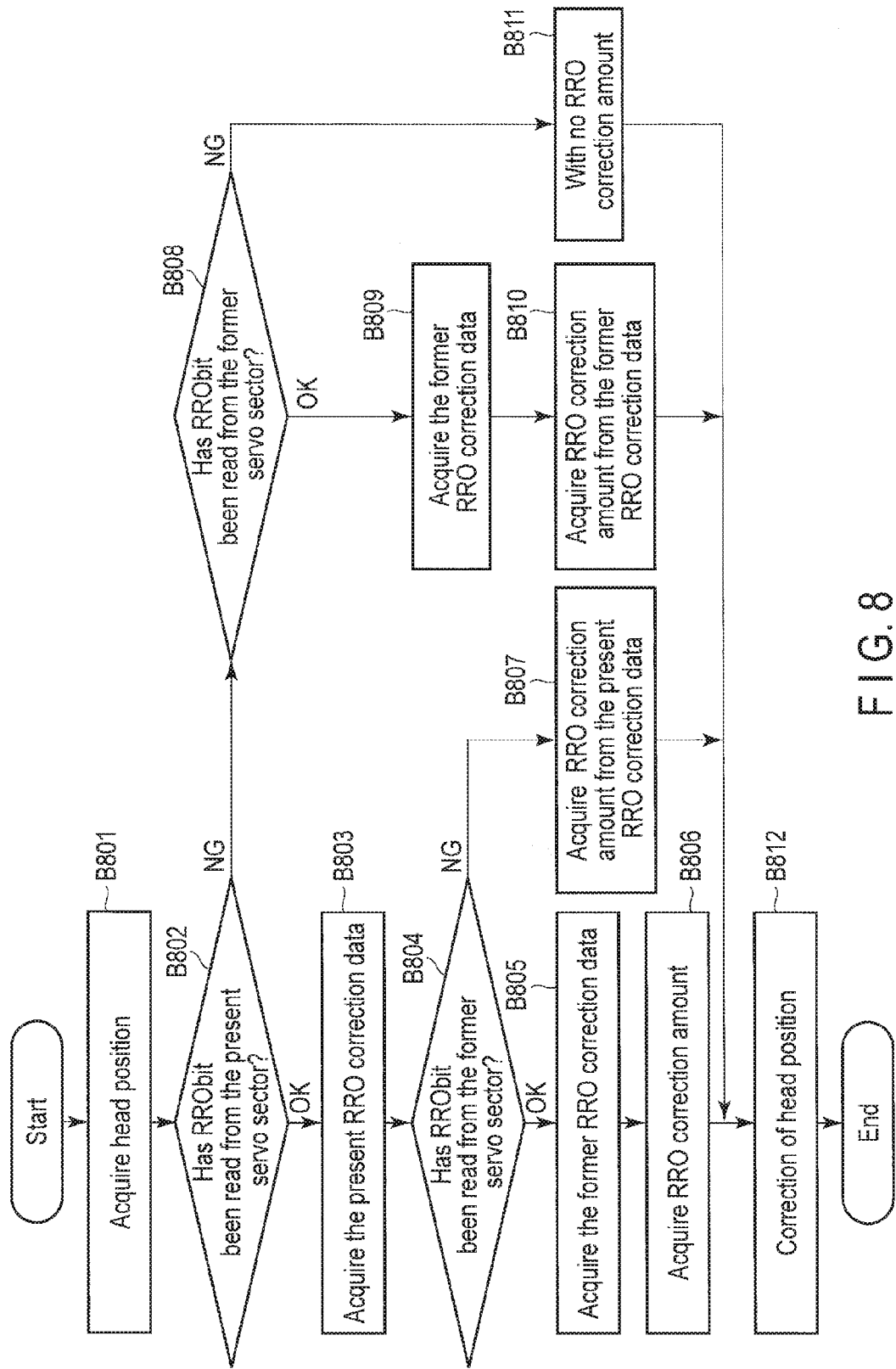
F I G. 8

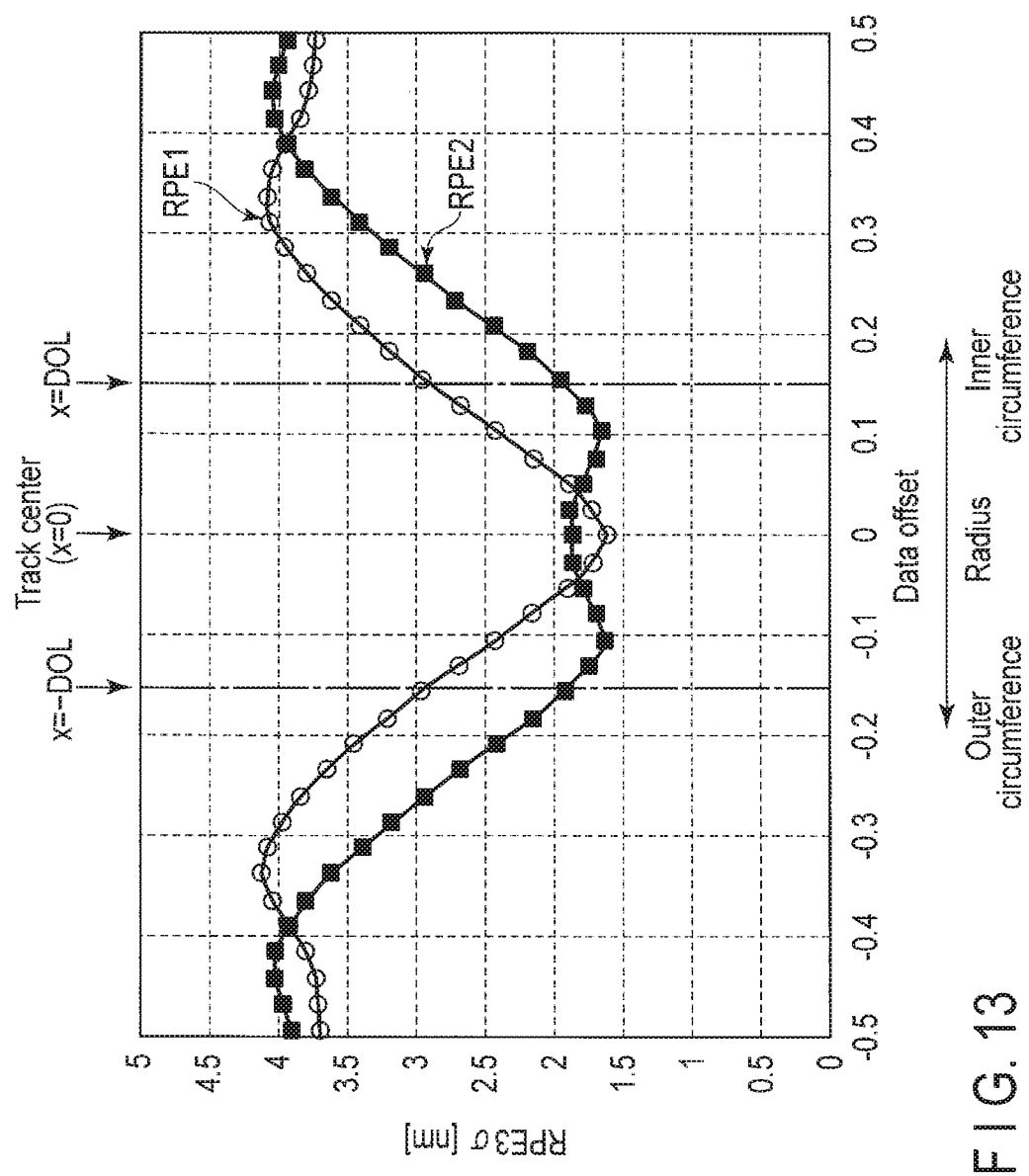
F I G. 13

MAGNETIC DISK DEVICE AND CORRECTION METHOD OF HEAD POSITION

CROSS-REFERENCE TO RELATED APPLICATIONS

This application claims the benefit of U.S. Provisional Application No. 62/306,442, filed Mar. 10, 2016, the entire contents of which are incorporated herein by reference.

FIELD

Embodiments described herein relate generally to a magnetic disk device and a correction method of a head position.

BACKGROUND

In a magnetic disk drive, servo data for positioning a magnetic head (hereafter simply referred to as a "head") to a target position on a magnetic disk (hereafter simply referred to as a "disk") is written on the disk itself. Specifically, the servo data is written in servo regions circumferentially arranged on the disk in a discrete manner at particular intervals. In order to position the head to a target position with high precision based on the servo data, a track where servo data is written desirably has a breadthways center, or a track center, which describes an ideal perfect circle.

However, it is general that what is described by the track center of a track on a disk is distorted and is deviated from a perfect circle. This is mainly caused by a wobble of the axis of rotation of a spindle motor which rotates the disk, i.e., a wobble in synchronization with the rotation of the disk. When what is described by the track center of a track is distorted, servo data will include a position error resulting from the distortion concerned, or, a position error resulting from a wobble which occurs in synchronization with the rotation of the disk and is called repeatable runout (RRO).

A magnetic disk drive executes RRO learning of a track center at a particular track, obtains RRO correction data, and writes the obtained RRO correction data in the track center of the particular track. When the magnetic disk drive writes the RRO correction data in the particular track, it first writes servo data, and then writes RRO correction data for correcting a position error resulting from RRO.

When the magnetic disk drive positions the head on the particular track, it reads the written RRO correction data, obtains an RRO correction amount from the read RRO correction data, and makes an adjustment to the position where the head is located using the obtained RRO correction amount.

When the RRO correction amount obtained by RRO learning executed while the head is at the track center can be read even when the head is located at a position distant from the track center by a particular distance (hereafter referred to as an "offset position"), the magnetic disk drive corrects the head position using the obtained RRO correction amount. In such a case, an actually corrected amount may be different from a proper RRO correction amount which should have been corrected. Accordingly, a servo positioning error (Repeatable Position Error: RPE) may be large when the head is at the offset position. Therefore, unlike the case where the head is at a track center, the magnetic disk drive may be unable to execute suitable RRO correction when the head is at the offset position.

When the head is at an offset position and RPE is large, it is highly possible that the head will leap out of a region where data writing is permitted. As a result, retries may occur, which causes rotational delay. Write performance will fall. Moreover, there is a possibility that adjacent data may be erased. Accordingly, it is hardly possible to narrow a data track pitch.

BRIEF DESCRIPTION OF THE DRAWINGS

FIG. 6 is a schematic diagram illustrating an exemplary head position range in which the RRO correction process in the first embodiment changes.

FIG. 8 is a flow chart which illustrates an exemplary head position correction process in the first embodiment.

FIG. 13 is a view illustrating an exemplary offset RPE profile of RRObit structures in the second embodiment.

DETAILED DESCRIPTION

In general, according to one embodiment, a magnetic disk drive comprising: a disk comprising tracks, each comprising a track center and servo sectors; a head configured to write data to the disk and read data from the disk; and a controller configured to acquire first correction data for repeatable runout occurring at one of the tracks and deviating from the track center in a first direction, and second correction data for repeatable runout different from the first correction data, to write the first correction data within a first permitted range including the track center and extending from the track center in the first direction, to write the second correction data within a write permitted range including the first permitted range and a second permitted range including the track center and extending from the track center in a second direction opposite to the first direction, to read at least one of the first correction data and the second correction data, and to correctly place the head within the write permitted range.

Hereafter, some embodiments will be explained with reference to the drawings.

First Embodiment

Figure 1:
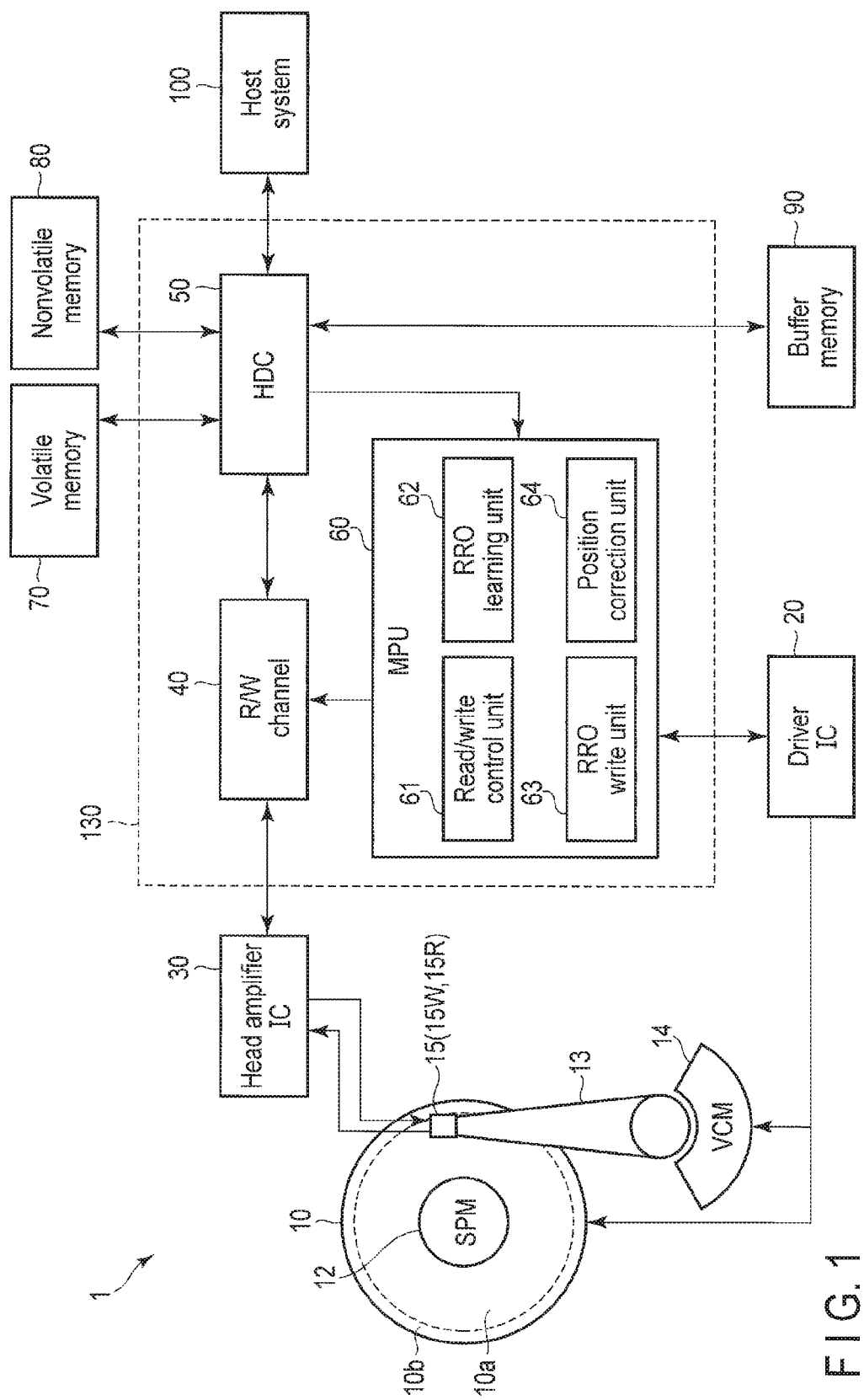
FIG. 1 is a block diagram illustrating an exemplary structure of a magnetic disk drive in a first embodiment.

FIG. 1 is a block diagram illustrating an exemplary structure of a magnetic disk drive 1 in a first embodiment.

The magnetic disk drive 1 comprises a head disk assembly (HDA), which will be described later, a driver IC 20, a head amplifier integrated circuit (hereinafter referred to as a "head amplifier IC") 30, a volatile memory 70, a nonvolatile memory 80, a buffer memory (buffer) 90, and a system controller 130 which is a one chip integrated circuit. Moreover, the magnetic disk drive 1 is connected with a host system (host) 100.

The HDA has a magnetic disk (hereinafter referred to as a "disk") 10, a spindle motor (SPM) 12, an arm 13 on which a head 15 is mounted, and a voice coil motor (VCM) 14. The disk 10 is rotated by the spindle motor 12. The arm 13 and the VCM 14 constitute an actuator. The actuator controls by the drive of the VCM 14 the movement of the head 15 mounted on the arm 13 toward a particular position on the disk 10. It is possible to provide two or more disks and two or more heads, instead of providing only a single disk 10 and only a single head 15.

The disk 10 has a data area. The data area has a recording region 10a which a user can use, and a system area 10b which holds information necessary for a system management.

Figure 2:
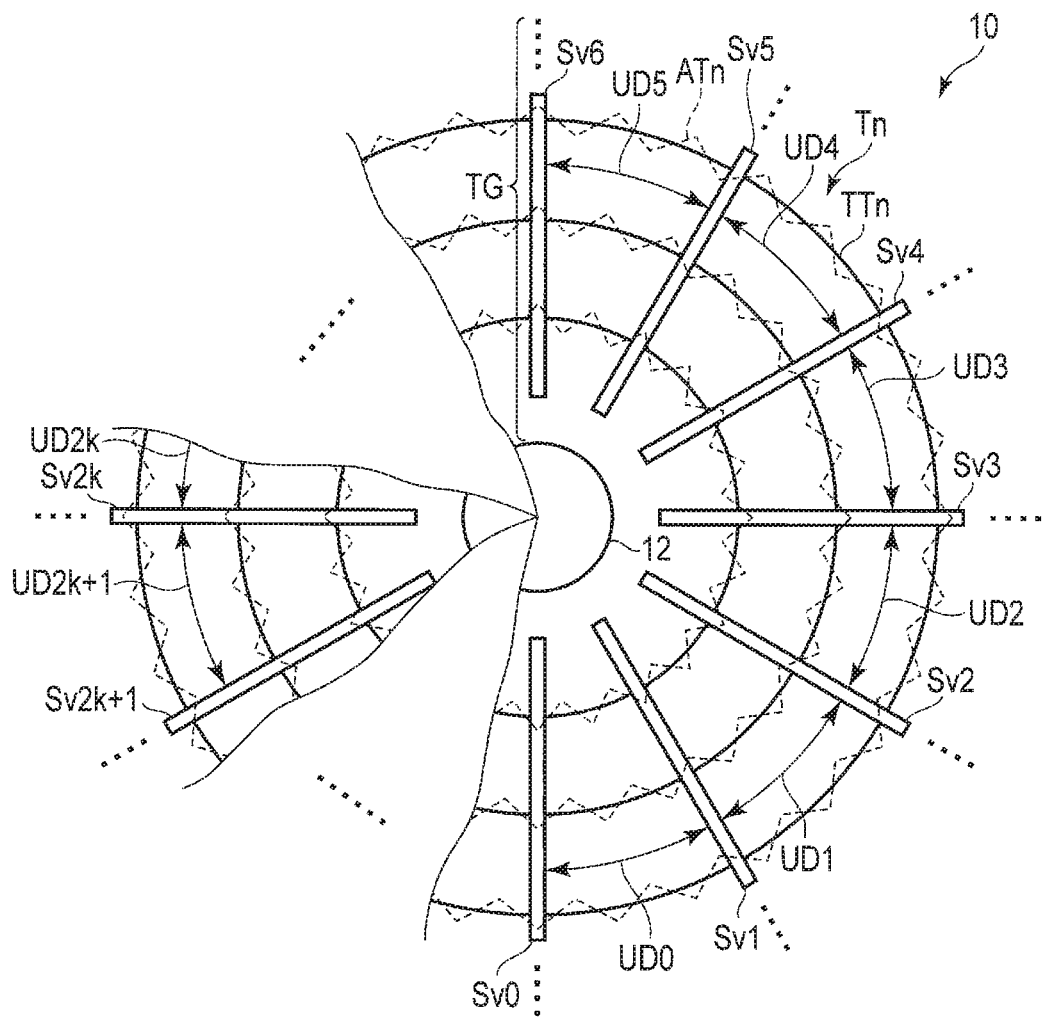
FIG. 2 is a schematic diagram illustrating an exemplary disk.

FIG. 2 is a schematic diagram illustrating an exemplary disk 10.

The disk 10 has tracks TG, which are concentrically arranged circles, for example. Instead, however, it is possible that the disk 10 may have one spiral track. The disk 10 further has servo regions Sv0, Sv1, SV2, Sv3, Sv4, SV5, Sv6, . . . , Sv2$k$, and SV2$k$+1 . . . . It should be noted here that the number attached to each servo region is called a servo number. For example, "0" in "Sv0", "2k" in "Sv2$k$", and "2k+1" in "Sv2$k$+1" are servo numbers. Servo regions Sv0-Sv2$k$+1 extend along respective radii (hereinafter simply referred to as "(to) radially extend") and are arranged along the circumference of the disk (hereinafter simply referred to as "(to be) circumferentially arranged") at regular intervals in a discrete manner. Moreover, a servo region may be called a servo frame.

The disk 10 has user-data regions UD0, UD1, UD2, UD3, UD4, UD5, UD6, . . . , UD2$k$, and UD2$k$+1, each interposed between any two adjacent servo regions Sv0-SV2$k$+1. One servo region and a user-data region adjacent to the servo region may be collectively called a servo sector. For example, servo region Sv2$k$+1 and user-data region UD2$k$+1 may be collectively called a servo sector.

FIG. 2 illustrates a particular track Tn, a target track center (target center) TTn, and an actual locus ATn of the head 15 which is brought following the target center. A target center is a path which a track has, and which is an ideal perfect circle and allows the head 15 to follow the track. In FIG. 2, concentrically arranged solid lines indicate target centers and zigzag dashed lines indicate loci which the head 15 generates when the head 15 follows the target centers one after another.

The servo regions Sv0-Sv2$k$+1 each hold servo data and RRO correction data. Servo data comprises a servo mark, address information, and burst data. A servo mark comprises specific codes (a pattern signal) used for identifying a corresponding servo sector. Address information comprises an address of a corresponding one of the tracks TG and an address of a corresponding one of the servo sectors in the track. Namely, address information comprises a cylinder address and a servo sector address.

Burst data is data (relative position data) used for detecting a positional deviation (position error) which indicates a distance from the head 15 to the target center of a target track among the tracks TG, and comprises repeated patterns with a particular cycle.

Burst data is written in a staggered manner and ranges over externally adjacent tracks. Burst data includes a position error resulting from a distortion which occurs to a track by a wobble produced in synchronization with the rotation of the disk 10 at the time of writing servo data (Repeatable Run Out: RRO), and once occurred causes the track to deviate from a perfect circle.

In order to correct the position error resulting from RRO, the pattern which constitutes RRO correction data (Hereafter, simply referred to as "RRO correction data") is written in the servo regions Sv0-Sv2$k$+1. RRO correction data is a kind of attached data attached to the servo data. RRO correction data is used for correcting a position error resulting from RRO of servo data (more specifically, servo burst data in servo data). That is, RRO correction data is used for correcting the distortion of a track from a perfect circle. Correction of this distortion may be called perfect circle correction.

RRO correction data includes an RRO preamble pattern, a synchronous pattern, and digital data in which correction amount is coded (hereinafter referred to as an "RRO correction symbol RROCode"). The RRO preamble pattern and the synchronous pattern are used for detecting a read start timing of the digital data which is indicative of a coded correction amount and is written in a succeeding region. At this time, the RRO correction symbol RROCode constitutes a main part of the RRO correction data. The region where such RRO correction data is written may be called RRObit or PostCode.

The head 15 has as a main body a slider where a write head 15W and a read head 15R are mounted. The read head 15R reads data currently recorded on a data track on the disk 10. The write head 15W writes data on the disk 10.

The driver IC 20 drives the SPM 12 and the VCM 14 under the control of the system controller 130 (specifically, the later described MPU 60).

The head amplifier IC 30 has a read amplifier and a write driver. The read amplifier amplifies the read signal read by the read head 15R, and transmits the amplified read signal to a read/write (R/W) channel 40. The write driver transmits a write current to the write head 15W according to the write data outputted from the R/W channel 40.

The volatile memory 70 is a semiconductor memory in which preserved data will be lost when an electric power supply is cut off. The volatile memory 70 stores data, etc., necessary for a process in each part of the magnetic disk drive 1. The volatile memory 70 is a synchronous dynamic random access memory (SDRAM), for example.

The nonvolatile memory 80 is a semiconductor memory which keeps preserved data even when an electric power supply is cut off. The nonvolatile memory 80 is a flash read only memory (flash ROM or FROM), for example.

The buffer memory 90 is a semiconductor memory which temporarily holds data, for instance, which is transmitted and received between the disk 10 and the host system 100. It should be noted that the buffer memory 90 and the volatile memory 70 may be arranged as one piece. The buffer memory 90 is, for example, a dynamic random access memory (DRAM), a static random access memory (SRAM), an SDRAM, a ferroelectric random access memory (FeRAM), a magnetoresistive random access memory (MRAM), or the like.

The system controller (controller) 130 is implemented on a large-scale integrated circuit (LSI) which is called System-on-a-Chip (SoC) and which comprises a single chip in which elements are integrated in a large-scale, for example. The system controller 130 comprises a read/write (R/W) channel 40, a hard disk controller (HDC) 50, and a microprocessor (MPU) 60.

The R/W channel 40 executes signal processing of read data and write data. The R/W channel 40 has a circuit or a function which measures signal quality of read data.

The HDC 50 controls data transfer between the host system 100 and the R/W channel 40 according to the instructions from the MPU 60.

The MPU 60 is a main controller which controls each part of the magnetic disk drive 1. The MPU 60 controls the VCM 14 through the driver IC 20, and executes servo control which positions the head 15. Moreover, the MPU 60 controls the operation of writing data to the disk 10.

The MPU 60 comprises a read/write control unit 61, an RRO learning unit 62, an RRO write unit 63, and a position correction unit 64. Furthermore, the MPU 60 executes each of these processes on firmware.

The read/write control unit 61 controls data read/write according to a command.

The RRO learning unit 62 positions the read head 15R to a particular target position of the disk 10, measures a difference (RRO correction amount) between a target position and a position of the head 15 (read head 15R) demodulated from the read servo data, and calculates RRO correction data from the measurement result (these steps are collectively called RRO learning). Here, a target position is a radial position on the disk 10 describing an orbit of a perfect circle. Moreover, the RRO learning unit 62 can obtain further information, such as a radial position or the like, by measuring an RRO correction amount at a particular target position. The RRO learning unit 62 may execute RRO learning about some radial positions of the disk 10, or may execute RRO learning about all radial positions of the disk 10. In the following, a particular target position where RRO learning is performed may be called a learning position.

In the following, the center position of the width of the head 15 may simply be called the head 15, the center position of the width of the write head 15W may simply be called the write head 15W, and the center position of the width of the read head 15R may simply be called the read head 15R.

Figure 3:
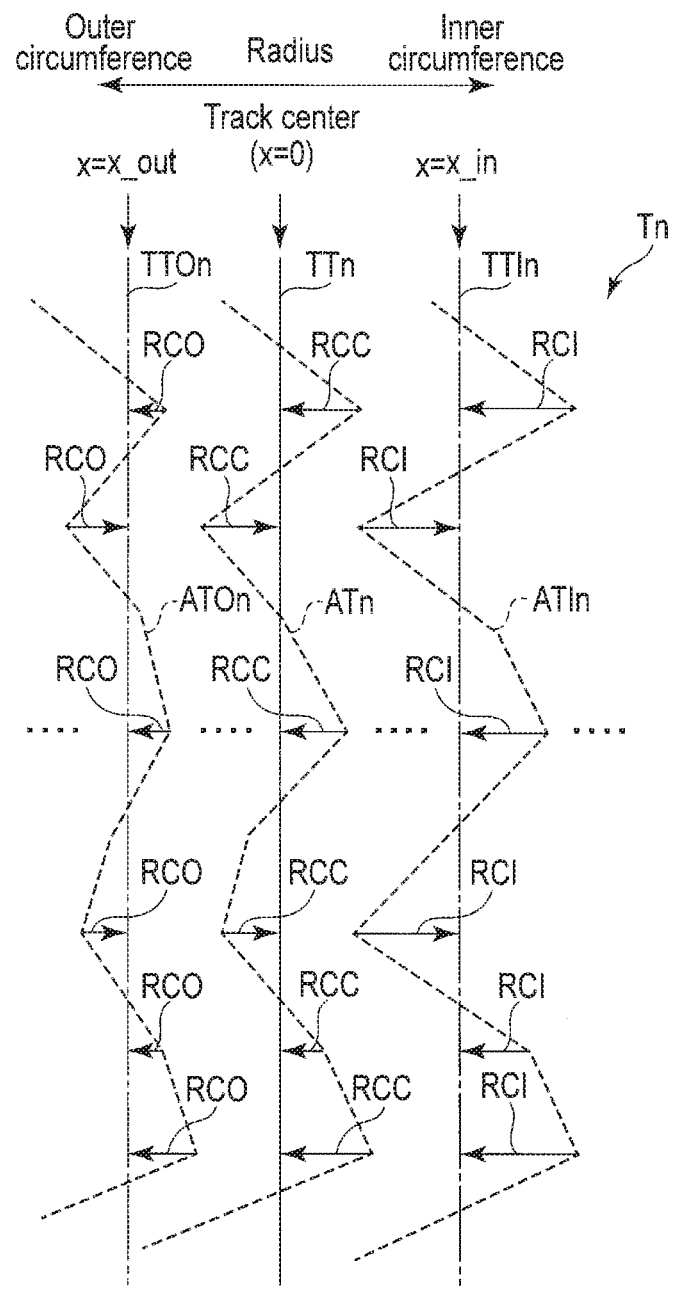
FIG. 3 is a conceptual diagram illustrating an exemplary RRO correction amount for a particular track.

FIG. 3 is a conceptual diagram illustrating an exemplary amount of RRO correction of a particular track Tn. In the following, a track Tn will be explained as an example for convenience of explanation. A particular radial distance from the target center of a particular track is assumed to be an offset amount x, and the position of the particular offset amount is called an offset position. It should be noted that tracks are curves as illustrated in FIG. 2, but tracks are illustrated as straight lines for convenience of illustration.

FIG. 3 illustrates a track center (x=0) (target center), an offset position x=x_out of an outer circumference side radially outward from a target center (hereinafter simply referred to as an "outer circumference side"), and a particular offset position x=x_in of an inner circumference side radially inward from the target center (hereinafter simply referred to as an "inner circumference side"). A target position in the offset position x=x_out is set to TTOn, and a target position in the offset position x=x_in is set to TTIn.

FIG. 3 also illustrates an actual locus ATn of the head 15 resulting from RRO in the offset position x=0, an actual locus ATOn of the head 15 resulting from RRO in the offset position x=x_out, and an actual locus ATIn of the head 15 resulting from RRO in the offset position x=x_in.

In FIG. 3, a difference between the target center TTn and the actual locus ATn of the head 15 is indicated by an RRO correction amount RCC, a difference between the target position TTIn and the actual locus ATIn of the head 15 is indicated by an RRO correction amount RCI, and a difference between a target position TTOn and an actual locus ATOn of the head 15 is indicated by an RRO correction amount RCO.

For example, the RRO learning unit 62 is positioned in the target center TTn, reads servo data, and obtains the RRO correction amount RCC from the difference between the target center TTn and the actual locus ATn of the head 15.

The RRO learning unit 62 positions the head to a target position TTOn radially outward from a target center by a particular distance, reads servo data, and obtains the RRO correction amount RCO from the difference between the target position TTOn and the actual locus ATOn of the head 15.

The RRO learning unit 62 positions head to a target position TTIn radially inward by a particular distance, similarly to the radially outward target position TTOn, reads servo data, and obtains the RRO correction amount RCI from a difference between the target position TTIn and the actual locus ATIn of the head 15.

The RRO learning unit 62 calculates RRO correction data from each of the obtained RRO correction amounts RCC, RCO and RCI. The RRO learning unit 62 may store in a memory, such as a volatile memory 70, for instance, the measurement result obtained by RRO learning, such as RRO correction data, for instance.

The RRO write unit 63 positions the head 15 (write head 15W) to a particular position such as a learning position, for instance, and writes there the RRO correction data obtained by RRO learning. At this moment, when the write head is successively brought to learning positions at a particular track pitch and data is successively written in the tracks of the disk 10, center positions of the respective widths which allow the RRO correction data actually written in the disk 10 to be read (hereafter referred to as "read widths") may shift from the respective learning positions. In such a case, it is possible for the RRO write unit 63 to previously detect a distance between a learning position and a center position of the RRO correction data read width, and to shift the write head 15W from the learning position at the time of writing RRO correction data.

The RRO write unit 63 writes at least one piece of RRO correction data in each servo region. For example, the RRO write unit 63 executes an RRO correction data write process in a testing stage or production stage of the magnetic disk drive 1.

The RRO write unit 63 can adjust the width which allows RRO correction data to be read (hereafter referred to as a "read width"). The RRO write unit 63 can increase or decrease read width according to an arrangement space, write conditions (for example, write current and write levitation), etc., of RRO correction data, for example. Moreover, the read width may increase or decrease according to design conditions, such as a write head width, a read head width, and so forth.

The RRO write unit 63 writes RRO correction data in such a manner that the center position of the read width of RRO correction data (hereinafter simply referred to as "RRO correction data") is arranged within a particular range which is radially set from a target center to allow data write for each track (hereinafter simply referred to as an "allowed range"). In the following, the RRO correction data written in the servo region may be called RRObit.

In the embodiment, the RRO write unit 63 writes RRO correction data in such a manner that reading by the head 15 (read head 15R) may be possible within a permission range extending from a target center to the upper limit (drift of Level: DOL) (hereafter simply referred to as an "upper limit") DOL of a radially outward region or a radially inward region. RRO correction data (RRObit) comprises RRO correction data for writing, and RRO correction data for reading. However, only the RRO correction data (RRObit) for writing will be explained.

Figure 4:
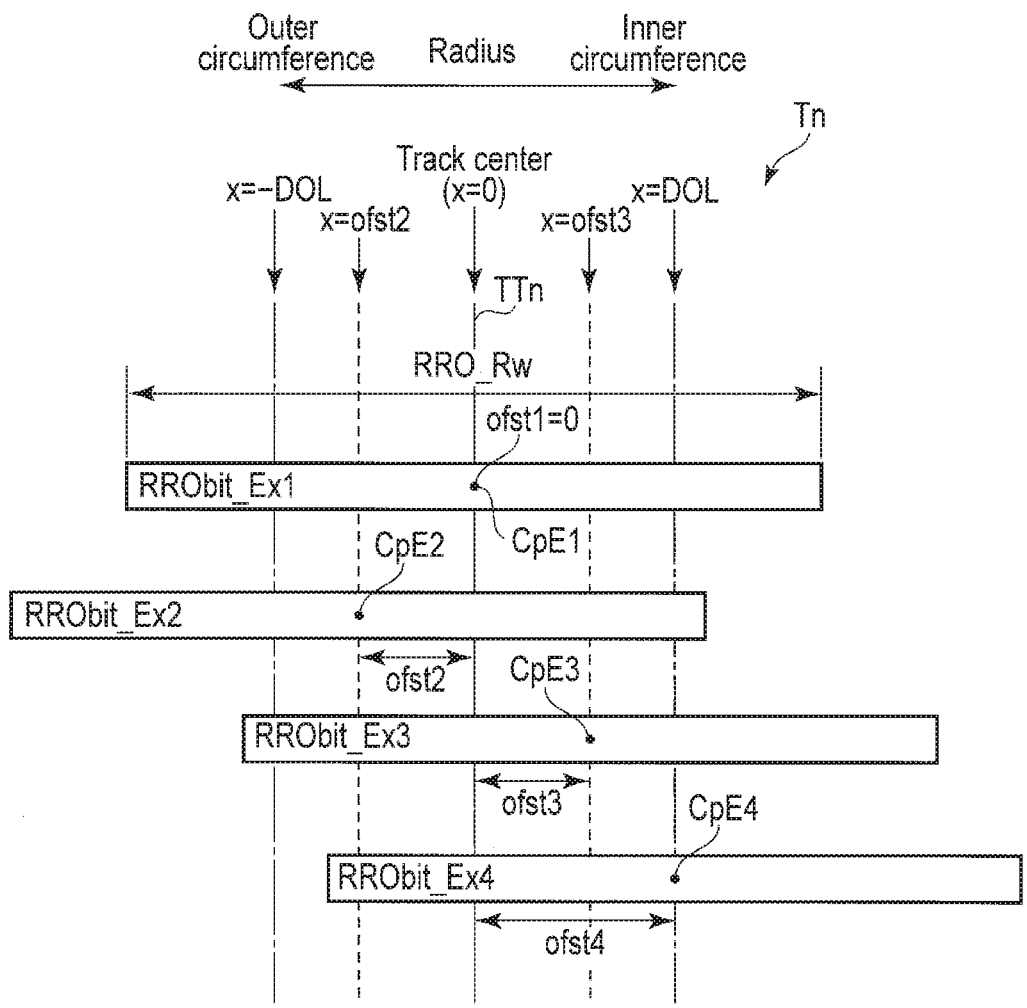
FIG. 4 is a view of an exemplary arrangement illustrating how RRObits are arranged within a permitted range.

FIG. 4 is a view illustrating an example of how RRObits are arranged in a permission range. In the following, the radially outward upper limit is set as x=−DOL, and the radially inward upper limit is set as x=DOL. In this case, the permission range will be −DOL<=x<=DOL. It should be noted that it is possible to set the radially outward upper limit as positive (x=DOL) and the radially inward upper limit as negative (x=−DOL), instead of setting the radially outward upper limit as negative (x=−DOL) and the radially inward upper limit as positive (x=DOL).

In FIG. 4, RRObit_Ex1, RRObit_Ex2, RRObit_Ex3, and RRObi_Ex4 are written in their respective positions which are within the permission range and are deviated by the particular respective offset amounts ofst1, ofst2, ofst3, and ofst4. Center CpE1 of RRObit EX1 is arranged at the target center TTn (x=ofst1=0). Center CpE2 of RRObit EX2 is arranged at a position x=x2 which is deviated radially outward by a particular offset amount (−DOL<x=Ofst2<0). Center CpE3 of RRObit EX3 is arranged at a position x=x1 which is deviated radially outward by a particular offset amount (0<x=ofst3<DOL). Center CpE4 of RRObit EX4 is arranged at a position x=DOL which is the radially outward upper limit (x=ofst4=DOL).

It should be noted that FIG. 4 illustrates RRObit_Ex1 as an RRObit read width RRO_Rw. Namely, FIG. 4 illustrates each of the radially extending respective widths of RRObit_Ex1-RRObit_Ex4 as an RRObit read width RRO_Rw.

It should be noted that FIG. 4 simply illustrates RRObits alone for convenience of illustration. Actually however a servo mark, address information, burst data, user data, etc., which are mentioned above are also written.

For example, as illustrated in FIG. 4, the RRO write unit 63 positions the write head 15W to offset write position x=ofst1=0 (target center), and writes as RRObit_Ex1 in offset write position x=ofst=0 where the read head 15R is positioned the RRO correction data obtained by RRO learning at offset position x=ofst1. Similarly to the case of RRObit_Ex1, the RRO write unit 63 successively positions the read head 15R to offset learning positions x=ofst2, x=ofst3, and x=ofst4, successively obtains RRO correction data by RRO learning at the respective offset learning positions x=ofst2, ofst3, and ofst4, and successively writes as RRObit_Ex2, RRObit_Ex3, and RRObit_Ex4 the obtained RRO correction data in the respective offset write positions x=ofst2, ofst3, and ofst4 whenever the write head 15W is successively positioned to the respective offset write positions.

Furthermore, in FIG. 4, the center position of the read width of RRO correction data (RRObit_Ex1, RRObit_EX2, RRObit_Ex3, and RRObit_Ex4) may deviate from a particular offset position x, which is a learning position, at the time of writing. In such a case, the RRO write unit 63 may write RRO correction data after a position of the write head has been shifted from a particular offset position x in such a manner that the center position of the read width of RRO correction data (RRObit_Ex1, RRObit_EX2, RRObit_Ex3, and RRObit_Ex4) may be in agreement with a learning position.

It should be noted that because of reduction test time, RRO correction data learned at more than two learning position can be written together in one write position. For example, In FIG. 4, two RRO correction data are acquired by positioning the read head to offset position x=ofst2 and x=ofst3. Two RRO correction data learned can be written in data track center(x=ofst1=0).

Figure 5A:
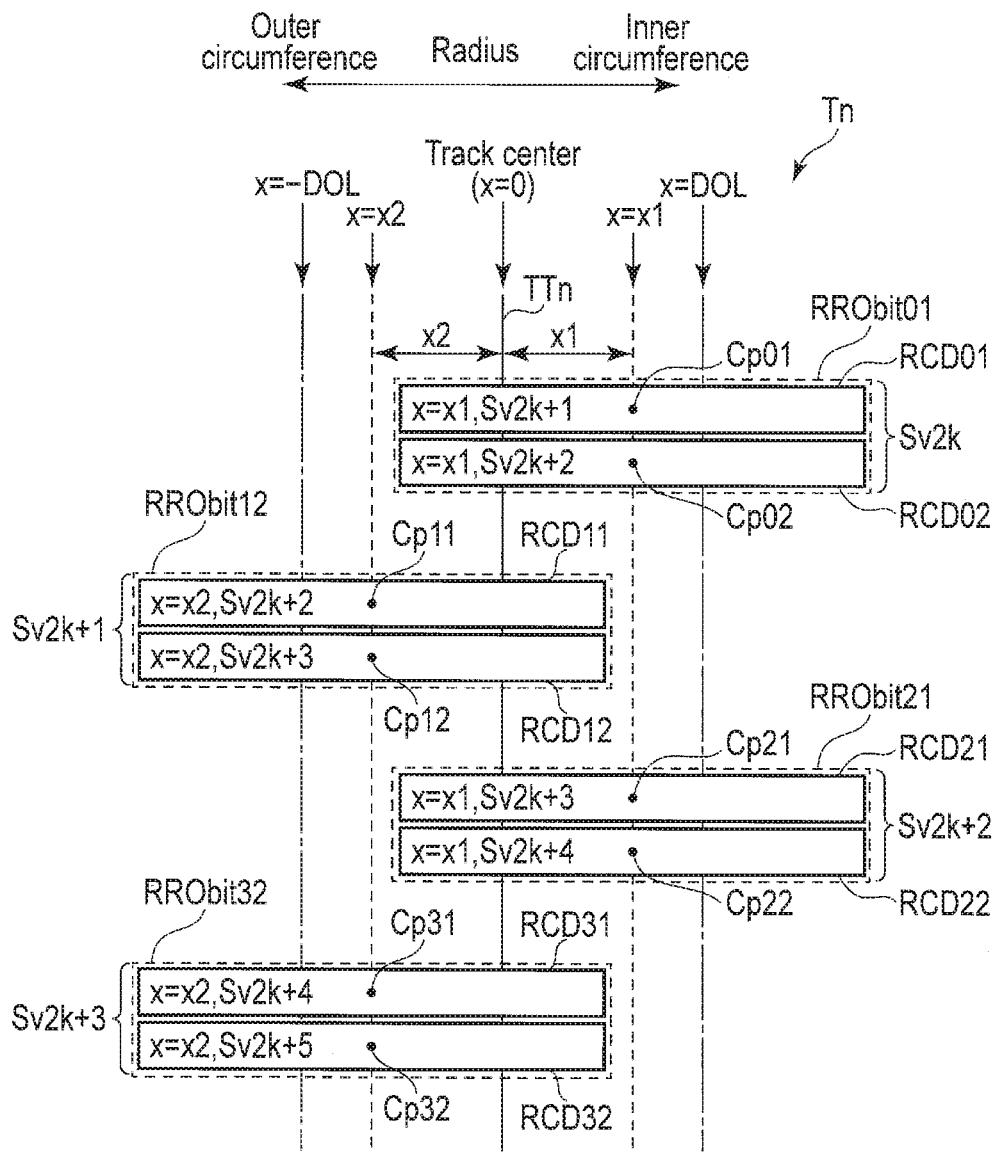
FIG. 5A is a view illustrating an exemplary arrangement of RRObits in the first embodiment.

FIG. 5A is a view illustrating an exemplary arrangement of RRObits in the present embodiment.

FIG. 5A illustrates that every servo region which has an even servo number (hereafter simply referred to as an even number servo region) has an inner circumference side offset position x=x1 where a single RRObit is arranged, and every servo region which has an odd servo number (hereafter simply referred to as an odd number servo region) has an outer circumference side offset position x=x2 where a single RRObit is arranged. FIG. 5A illustrates servo region Sv2*k* and servo region Sv2*k*+2 as exemplary even number servo regions and servo region Sv2*k*+1 and servo region Sv2*k*+3 as exemplary odd number servo regions.

An exemplary even number servo region illustrated in FIG. 5A will be explained. Servo region Sv2*k* includes RRObit01, and servo region Sv2*k*+2 includes RRObit21.

Let us suppose that a servo region indicated by the present servo number (hereinafter simply referred to as a present servo region) is SV2*k*, then RRObit01 should include RRO correction data RCD01 for a servo region Sv2*k*+1 next to the present servo region and indicated by a servo number next to the present servo number (hereinafter simply referred to as a next servo region) and RRO correction data RCD02 for a servo region Sv2*k*+2 next to the servo region Sv2*k*+1. Center Cp01 of RRO correction data RCD01 and center Cp02 of RRO correction data RCD02 are arranged on the inner circumference side offset position x=x1 (0<x=x1<DOL).

RRObit21 includes RRO correction data RCD21 for a servo region v2*k*+3 next to the present servo region Sv2*k*+2, and RRO correction data RCD22 for a servo region Sv2*k*+4 next to the servo region Sv2*k*+3. Center Cp21 of RRO correction data RCD21 and center Cp22 of RRO correction data RCD22 are arranged at the inner circumference side offset position x=x1 (0<x=x1<DOL).

Now, an exemplary odd number servo region illustrated in FIG. 5A will be explained. Servo region Sv2*k*+1 includes RRObit12, and servo region Sv2*k*+3 includes RRObit32.

RRObit12 includes RRO correction data RCD11 for servo region Sv2*k*+2 next to the present servo region Sv2*k*+1, and RRO correction data RCD12 for servo region Sv2*k*+3 next to the servo region Sv2*k*+2. Center Cp11 of RRO correction data RCD11 and center Cp12 of RRO correction data RCD12 are arranged on the outer circumference side offset position x=x2 (−DOL<x=x2<0).

RRObit32 includes RRO correction data RCD31 for servo region Sv2*k*+4 next to the present servo region Sv2*k*+3, and RRO correction data RCD32 for servo region Sv2*k*+5 next to the servo region Sv2*k*+4. Center Cp31 of correction data RCD31 and center Cp32 of correction data RCD32 are arranged on the outer circumference side offset position x=x2 (−DOL<x=x2<0).

The RRO write unit 63 writes RRObit in a target offset position which includes the offset position of RRObit of the present servo region and is in the servo region of the servo sector which is circumferentially adjacent to a servo sector including the present servo region (hereinafter simply referred to as a present servo sector). The RRO write unit 63 may write RRObit in a previously set offset position, or may write RRObit in an arbitrarily specified offset position in accordance with a command.

For example, the RRO write unit 63 writes RRObits over some servo regions in a staggered manner with centering on a target center.

As illustrated in FIG. 5A, the RRO write unit 63 writes RRObit14 in offset position x=x1 of even number servo region Sv2$k$, and writes RRObit21 in offset position x=x1 of even Sv servo region 2$k$+2 (even servo region. Sv2$k$+2). Furthermore, the RRO write unit 63 writes RRObit12 in offset position x=x2 of odd number servo region Sv2$k$+1, and writes RRObit32 in offset position x=x2 of odd number servo region Sv2$k$+3, for example. Here, x1 and x2 may be the same in value, or x1 and x2 may be different in value.

The RRO write unit 63 writes in a particular servo region in a servo sector both RRO correction data of an offset position of a servo region included in a servo sector which is next to the servo sector including the particular servo region (hereinafter simply referred to as a next servo region) and RRO correction data of an offset position of a servo region which is next to the servo region which in turn is next to the particular servo region.

For example, the RRO write unit 63 writes in an offset position x=x1 of an even number servo region Sv2$k$ both RRO correction data RCD01 for an offset position x=x1 of the next servo region Sv2$k$+1 and RRO correction data RCD02 for an offset position x=x1 of the servo region Sv2$k$+2 next to the servo region Sv2$k$+1.

The RRO write unit 63 writes in, for example, an offset position x=x1 of an even number servo region Sv2$k$+2 both RRO correction data RCD21 for the offset position x=x1 of the next servo region Sv2$k$+3 and RRO correction data RCD22 for the offset position x=x1 of the servo region Sv2$k$+4 next to the servo region Sv2$k$+3.

In an odd number servo region, the RRO write unit 63 also performs the same process as an even number servo region. Namely, the RRO write unit 63 writes both RRO correction data RCD11 and RRO correction data RCD12 in an offset position x=x2 of an odd number servo region Sv2$k$+1, and writes both RRO correction data RCD31 and RRO correction data 32 in an offset position x=x2 of an odd number servo region SV2$k$+3.

It should be noted that the RRO write unit 63 may write in one servo region three or more pieces of RRO correction data, instead of two pieces of RRO correction data. Moreover, the RRO write unit 63 may write in one servo region two or more pieces of RRO correction data of different offset positions.

Figure 5B:
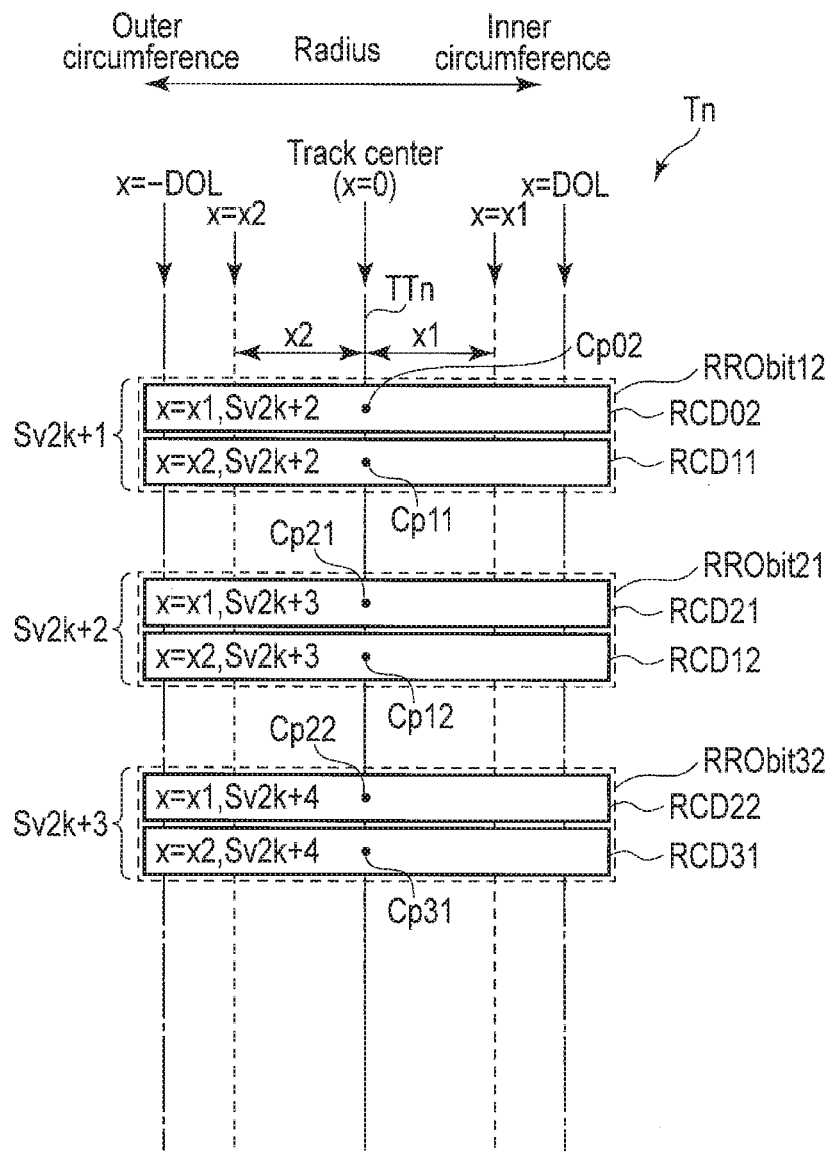
FIG. 5B is a view illustrating an exemplary arrangement of RRObits in the first embodiment.

As illustrated in FIG. 5B, it should be noted that if RRO correction data learned at two learning positions are written in every servo sectors of the data track center, written RRO correction data in every servo sectors may be the RRO correction data of two learning positions of next servo sector.

Sv=2$k$+1:RCD11(x=x2,Sv=2$k$+2), RCD02(x=x1, Sv=2$k$+2)

Sv=2$k$+2:RCD12(x=x2,Sv=2$k$+3), RCD21(x=x1, Sv=2$k$+3)

In the following, a case in which correction data acquired at a learning position comprises a piece of correction data for a next sector and a piece of correction data for the sector after next both having been arranged as a single RRObit in the learning position will be explained. It should be noted that RRObit offset amount x in the following explanation should be just taken as a learning position when two pieces of data concerning two respective learning positions are collectively written in a single track center as a single RRObit.

The RRO write unit 63 causes the head 15 to write or read RRObit within a range extending from a target center to the upper limit DOL of the outer circumference side or the inner circumference side (0≤|x|≤DOL). In this case, an RRObit offset amount x is set within the following range:

$$DOL\text{-}RRO\_Rw/2 \leq |x| \leq RRO\_Rw/2 \qquad (1).$$

Here, since reading by the head 15 is possible within the range extending from the target center to the upper limit DOL of the outer circumference side or the inner circumference side, the read width RRO_Rw satisfies the following expression:

$$RRO\_Rw > DOL \qquad (2).$$

For example, in FIG. 5, the RRO write unit 63 sets an RRObit offset amount x1 of an even number servo region within the range indicated by the following expression:

$$DOL\text{-}RRO\_Rw/2 \leq x1 \leq RRO\_Rw/2 \qquad (3).$$

The RRO write unit 63 sets an RRObit offset amount x2 of an odd number servo region within the range indicated by the following expression:

$$-RRO\_Rw/2 \leq x2 \leq -DOL+RRO\_Rw/2 \qquad (4).$$

Moreover, when RRObit can be written in a position specified by the upper limit DOL of the permission range or the vicinity of the position specified by the upper limit DOL of the permission range on condition that RRObit should be within the range of the set RRObit offset amount, RPE can be appropriately reduced by arranging RRObit in the vicinity of the upper limit DOL of the permission range.

When RRObit can be written in the position specified by the upper limit DOL of the permission range or the vicinity of the position specified by the upper limit DOL of the permission range on condition that RRObit should be within the range of the set RRObit offset amount, the RRO write unit 63 may write RRObit in the position specified by the upper limit DOL of the permission range or the vicinity of the position specified by the upper limit DOL of the permission range.

For example, the RRO write unit 63 writes RRObit in an offset position x1=DOL of an even number servo region, and an offset position x2=−DOL of an odd number servo region.

When the RRObit read width RRO_Rw is DOL<RRO_Rw<2DOL and RRObit is written in an offset position |x|=DOL, then RRObit cannot be read in the target center. In this case, therefore, the RRO write unit 63 writes RRObit in an offset position x1=RRO_Rw/2 of an even number servo region, and an offset position x2=−RRO_Rw/2 of an odd number servo region.

The position correction unit 64 reads RRO correction data from RRObit, calculates the RRO correction amount from the read RRO correction data, and corrects the position of the head 15 (hereafter simply referred to as a head position) with reference to the RRO correction amount and the read RRObit offset position.

FIG. 6 is a schematic diagram illustrating an exemplary head position range in which the RRO correction process in the present embodiment changes. FIG. 6 is almost equivalent to FIG. 5A, but the permission range is divided into some regions. In FIG. 6, portions like those illustrated in FIG. 5A are denoted by the same reference numbers and their detailed explanations are omitted.

In FIG. 6, the permission range (−DOL≤x≤DOL) is divided into three regions; region Reg1, region Reg2, and region Reg3. Here, the region Reg1 has a following range:

$$x2+RRO\_Rw/2 < x \leq DOL \quad (5).$$

The region Reg2 has a following range:

$$-DOL < x \leq x1-RRO\_Rw/2 \quad (6).$$

The region Reg3 has a following range:

$$x1-RRO\_Rw/2 \leq x \leq x2+RRO\_Rw/2 \quad (7).$$

When the head 15 is positioned within the range of the region Reg1, the position correction unit 64 reads RRObits written in the offset position x=x1 of the even number servo region, for example, it reads RRObit01 and RRObit21. In this case, the position correction unit 64 refers to the offset position x=x1 of the even number servo region and the RRO correction amount obtained from the RRO correction data written in the offset position x=x1, and makes corrections to the head position so as to locate the head within the permitted range or, for instance, in the target center.

The position correction unit 64 reads RRObits, for example, RRObit12 and RRObit32, written in the offset position x=x2 of the odd number servo region when the head 15 is positioned within the range of the region Reg2. In this case, the position correction unit 64 refers to the offset position x=x2 of the odd number servo region and the RRO correction amount obtained from the RRO correction data written in the offset position x=x2, and makes corrections to the head position so as to locate the head within the permitted range or, for instance, in the target center.

When the head 15 is positioned within the range of the region Reg3, the position correction unit 64 will read all the RRObits, including RRObit written in the offset position x=x1 of the even number servo region and RRObit written in the offset position x=x2 of the odd number servo region. In this case, the position correction unit 64 refers to RRO correction data written in the offset position x=x1 of the even number servo region, the offset amount x1, the RRO correction amount obtained from the RRO correction data written in the offset position x=x2 of the odd number servo region, and the offset amount x2, and makes corrections to the head position so as to locate the head within the permitted range or, for example, in the target center.

Figure 7:
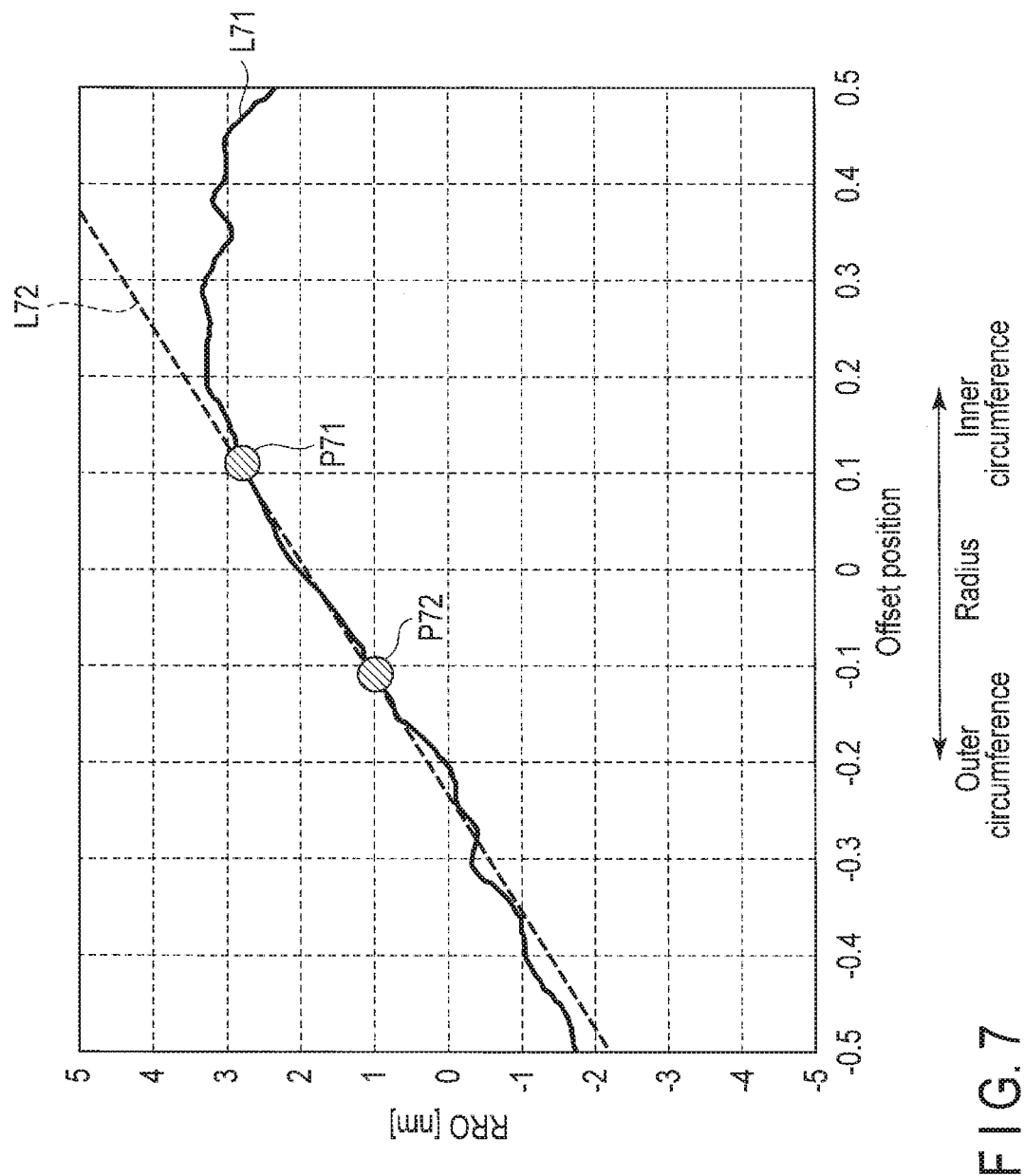
FIG. 7 is a view illustrating an exemplary relation between RRO correction amounts and positions where a head is positioned when it is possible to read RRO correction data from all the servo regions.

FIG. 7 is a view illustrating an exemplary relation between the position where the head 15 is positioned and the RRO correction amount when it is possible to read RRO correction data from all the servo regions. In FIG. 7, the vertical axis indicates the RRO correction amount, and the horizontal axis indicates the offset position. For example, FIG. 7 illustrates a case where the read head 15R is positioned to Reg3 of FIG. 6.

In FIG. 7, P71 is the RRO correction data (first RRO correction data) written in a particular offset position within the limits to the upper limit DOL at the inner circumference side. P72 is the RRO correction data (second RRO correction data) written in the particular offset position within the limits to the upper limit DOL at the outer circumference side. L71 indicates the change of the RRO correction amount radially measured in each radial target position of the disk 10 (hereafter referred to as measured value distribution). L72 indicates the change of the radial RRO correction amount (hereafter referred to as predicted value distribution) calculated from the first RRO correction data P71 and the second RRO correction data P72. In FIG. 7, predicted value distribution is almost equivalent to measured value distribution, and falls in the range between the offset position of the first RRO correction data and the offset position of the second RRO correction data.

The position correction unit 64 calculates predicted value distribution from the first RRO correction data and the second RRO correction data, refers to the predicted value distribution and the position where the head 15 is positioned, and calculates the RRO correction amount for the position where the head 15 is positioned. The position correction unit 64 makes adjustment to the head position with reference to the calculated RRO correction amount for the position where the head 15 is positioned, and the offset position of the read first RRO correction data or the offset position of the read second RRO correction data. Now, let us suppose here that the position where the head 15 is positioned should be set to hp, and that the head 15 should be positioned within the range which extends from the upper limit of the outer circumference side to the upper limit of the inner circumference side and is expressed as:

$$x1-RRO\_Rw/2 \leq hp \leq x2+RRO\_Rw/2 \quad (8),$$

the head position correction amount will be obtained by the following expressions:

$$RROh(hp)=(RRO2-RRO1)/(x2-x1) \times (hp-x1)+RRO1 \quad (9) \text{ or}$$

$$RROh(hp)=(RRO2-RRO1)/(x2-x1) \times (hp-x2)+RRO2 \quad (10).$$

FIG. 8 is a flow chart which illustrates an exemplary head position correction process of the present embodiment.

MPU 60 acquires a head position (B801), and determines whether RRObit has been read from the present servo sector (B802). When RRObit of the present servo sector is read (O.K. of B802), MPU 60 obtains RRO correction data for the present servo region (hereafter referred to as the present RRO correction data) (B803), and determines whether RRObit has been read from the servo sector previous to the present servo sector (hereafter referred to as a former servo sector) (B804).

When RRObit of the former servo sector is already read (O.K. of B804), MPU 60 obtains the RRO correction data for the former servo sector (hereafter referred to as former RRO correction data) (B805).

MPU 60 refers to the present RRO correction data and the former RRO correction data and calculates an RRO correction amount suitable for adjusting the next head position where the head is positioned (B806). At this time, MPU 60 determines whether the head position is in the range of the formula (8), and calculates the RRO correction amount using the formula (9) or the formula (10).

When RRObit of the former servo sector has not been read yet (NG of B804), MPU 60 obtains the RRO correction amount from the present RRO correction data (B807).

In B802, when RRObit has not been read from the present servo sector (NG of B802), MPU 60 determines whether RRObit has been read from the former servo sector (B808).

When RRObit has been read from the former servo sector (O.K. of B808), MPU 60 obtains the former RRO correction data (B809), and obtains the RRO correction amount from the former RRO correction data (B810).

When RRObit has not been read from the former servo sector (NG of B808), MPU 60 makes null (=0) the RRO correction amount (B811).

MPU 60 corrects the head position with the use of the obtained RRO correction amount and the read RRObit offset position (B812), and it ends the process. At this moment, MPU 60 makes adjustment to the head position so as to locate the head within the permitted range, for example, to a target center.

It should be noted that if RRO correction data learned at two learning positions are written in every servo sectors of the data track center, whether RRObit is read OK or NG only have to be judged. If RRObit is read OK, the head position is corrected by RRO correction amount calculated by equation (9) or (10).

If RRObit is read NG, the head position is not corrected, i.e., RRO correction amount is 0.

The magnetic disk drive 1 in the present embodiment comprises a disk 10 which has tracks, each having servo regions. Each of the servo regions comprises an outer circumference side and an inner circumference side. Each of the outer circumference side and the inner circumference side has a particular offset position where RRO correction data is held. Each of the offset position of RRO correction data is set within a readable range within a range extending to the upper limit of the outer circumference side or a range extending to the upper limit of the inner circumference side. The offset positions each at the outer circumference side and the offset positions each at the inner circumference side alternately hold RRO correction data in the servo regions. That is, RRO correction data is written in an offset position radially different from any adjacent offset positions of the respective servo regions of any adjacent servo sectors.

According to the position of the head 15 positioned on a particular track, the magnetic disk drive 1 reads suitable RRO correction data, and obtains an RRO correction amount. The magnetic disk drive 1 corrects the head position with the use of the obtained RRO correction amount and the offset position of the read RRO correction data, so that the head may be located in the permitted range. Accordingly, in the magnetic disk drive 1, RPE will be improved among positioning qualities of positioning the head 15 in an offset position.

Moreover, RRO correction data is written in an offset position radially different from offset positions of servo regions of the circumferentially adjacent servo sectors. Accordingly, when a piece of RRO correction data is read in the magnetic disk drive 1, interference from pieces of RRO correction data arranged at radially adjacent tracks will be suppressed.

Subsequently, another magnetic disk drive and another head position correcting method, both in another embodiment, will be explained. In another embodiment, the same referential mark is attached to the same portion as the above-mentioned embodiment, and the detailed explanation is omitted.

Second Embodiment

A magnetic disk drive 1 in a second embodiment is different from the first embodiment in that RRO correction data is written in a permitted range.

Figure 9:
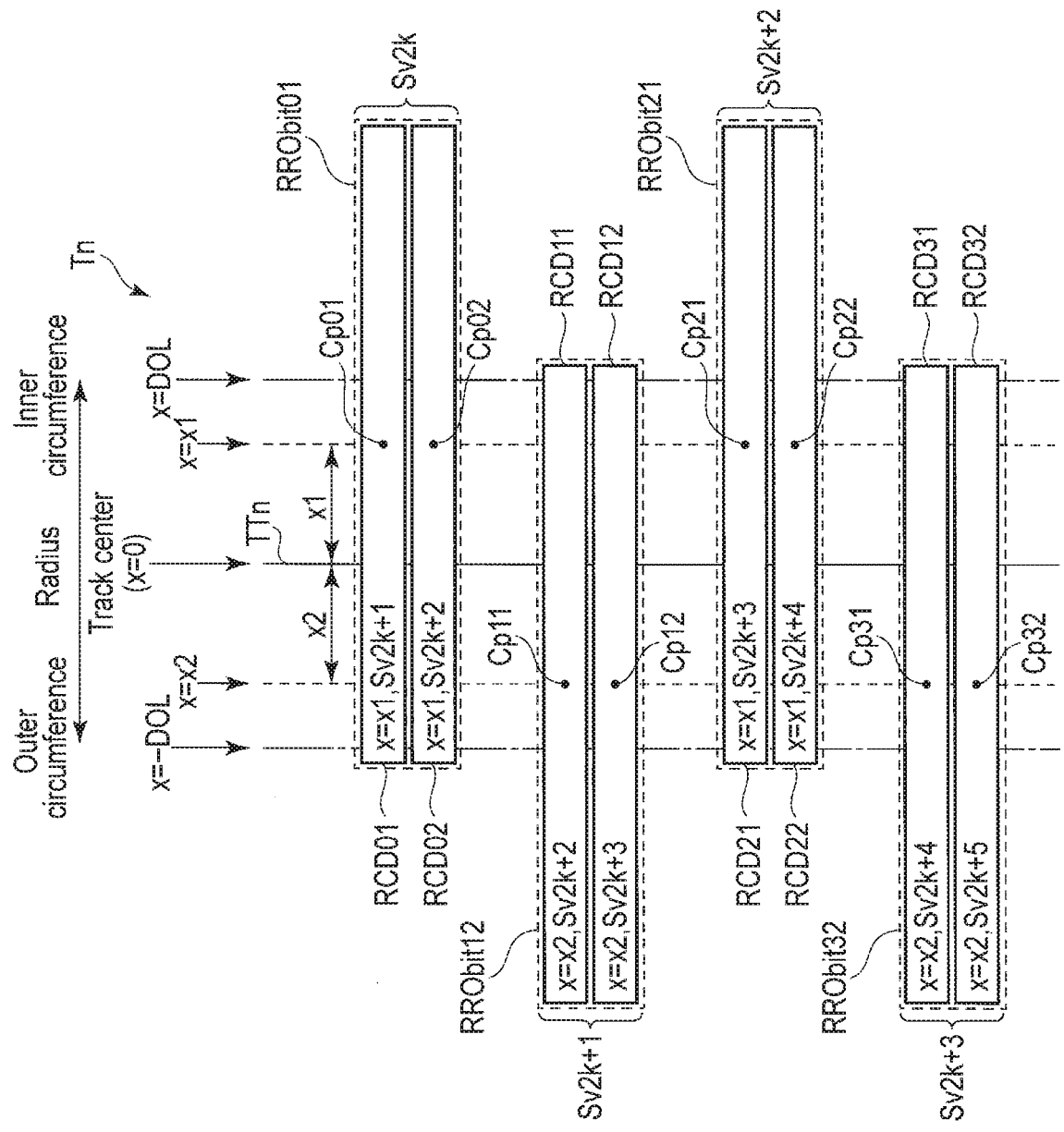
FIG. 9 is a view illustrating an exemplary RRObits arrangement in a second embodiment.

FIG. 9 is a view illustrating an exemplary arrangement of RRObits in the embodiment. Although FIG. 9 is almost equivalent to FIG. 5A, the read width of each RRObit is different. In FIG. 9, the same referential marks are attached to the same portions as FIG. 5A, and their detailed explanation is omitted.

The RRO write unit 63 writes RRObit in the permitted range ($-DOL \leq x \leq DOL$) so that reading by the head 15 may be possible. In this case, an RRObit offset amount x is set within the following range:

$$0 \leq |x| \leq RRO\_Rw/2 - DOL \quad (11).$$

The head 15 can read RRObit within the permitted range. Accordingly, read width RRO_Rw satisfies the following:

$$RRO\_Rw > 2DOL \quad (12).$$

For example, in FIG. 9, the RRO write unit 63 sets the RRObit offset amount x1 of an even number servo region within the following range:

$$0 \leq x1 \leq RRO\_Rw/2 - DOL \quad (13),$$

and the RRObit offset amount x2 of an odd number servo region is set within the following range:

$$-RRO\_Rw/2 + DOL \leq x2 \leq 0 \quad (14).$$

Figure 10:
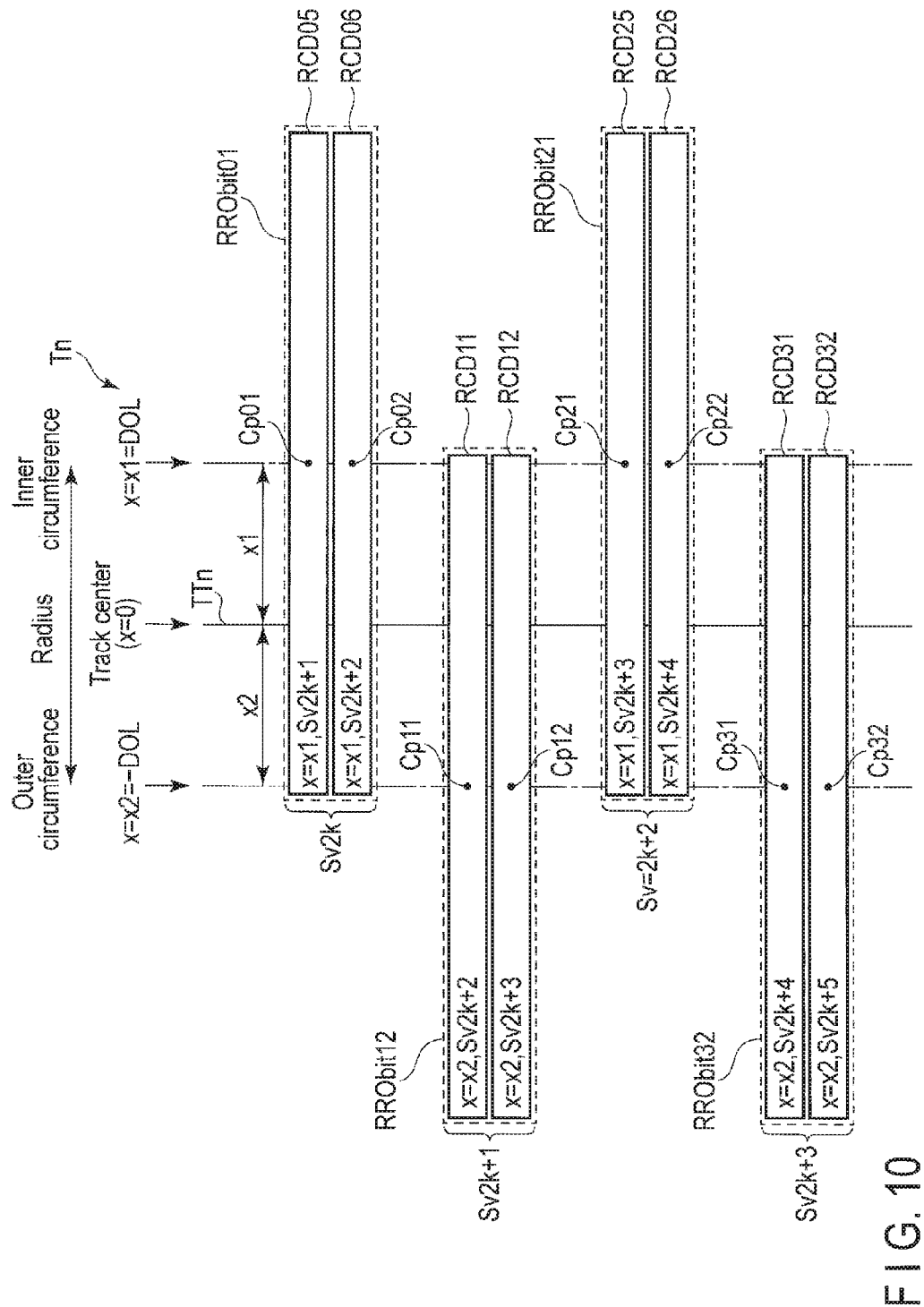
FIG. 10 is a view illustrating another exemplary RRObits arrangement in the second embodiment.

FIG. 10 is a view illustrating an exemplary arrangement of RRObits in the embodiment. FIG. 10 is almost equivalent to FIG. 5A, but FIG. 10 is different from FIG. 5A in the read width of each RRObit and the offset position of RRO correction data.

In FIG. 10, RRObit of an even number servo region is written in offset position x=x1=DOL, and RRObit of an odd number servo region is written in offset position x=x2=−DOL.

In a case where RRObit can be written in a position of the upper limit DOL of the permitted range or the vicinity of the position of the upper limit DOL of the permitted range within the set RRObit offset amount, the RRO write unit 63 may write RRObit in the position of the upper limit DOL of the permission range or the vicinity of the position of the upper limit DOL in order to appropriately reduce RPE.

For example, as illustrated in FIG. 10, the RRO write unit 63 writes RRObit in offset position x1=DOL of an even number servo region, and offset position x2=−DOL of an odd number servo region.

In this case, the RRO write unit 63 can obtain the optimal offset position near the position of the upper limit DOL of the permission range, and can also write RRObit in the obtained optimal offset position.

For example, the RRO write unit 63 calculates the difference between values of offset positions of measured value distribution and values of offset positions of predicted value distribution (hereafter referred to as correction-errors distribution), and obtains as an optimal offset position an offset position which makes minimal the square sum of the value of the offset position of correction-errors distribution (hereafter referred to as an evaluation value).

Here, a head position is set to hp, the measured value of the particular offset position of measured value distribution of the RRO correction amount is set to RRO (hp), and the predicted value of the particular offset position of predicted value distribution of the RRO correction amount is set to RROh (hp). The difference value dRRO (hp) between the RRO correction amount measured value RRO (hp) and the RRO correction amount predicted value RROh (hp) may be expressed as follows:

$$dRRO(hp) = RRO(hp) - RROh(hp) \quad (15).$$

Square sum (evaluation value) SS of the difference value dRRO within the permitted range (hp) will be as follows:

$$SS = \Sigma dRRO(hp): -DOL \leq hp \leq DOL \quad (16).$$

The RRO write unit 63 calculates square sum (evaluation value) SS of the difference value dRRO (hp) of the write permitted range illustrated in the formula (16). The RRO write unit 63 writes RRObit in an offset position which satisfies the range of the offset amount x1 where RRObit is arranged and the range of the offset amount x2 where RRObit is arranged, and which makes the evaluation value SS minimal.

Figure 11:
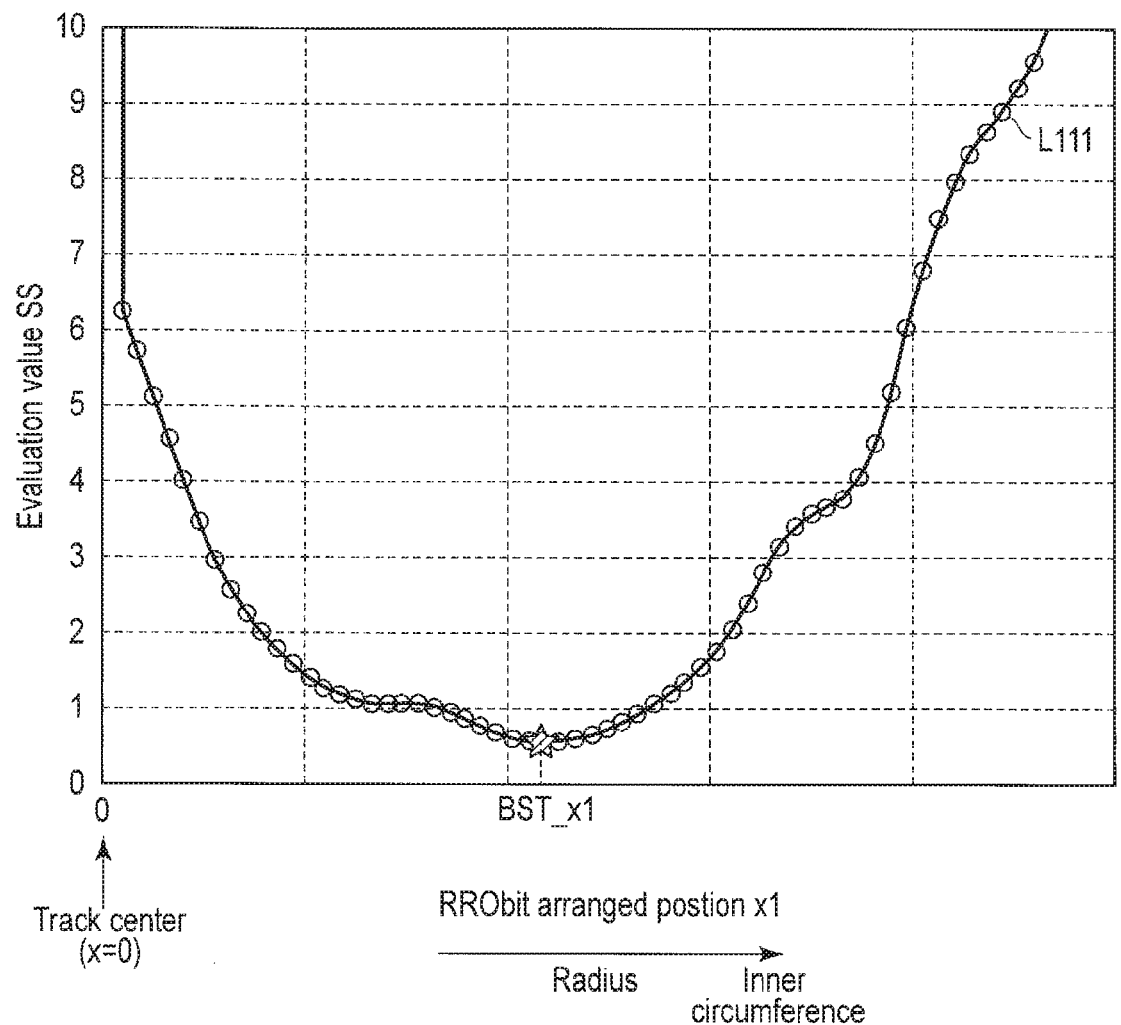
FIG. 11 is a view illustrating an exemplary square sum of a difference between a measured value and a predicted value for the RRO correction amount of a particular offset position.

FIG. 11 is a view illustrating an exemplary square sum (evaluation value) SS of the difference dRRO (hp) between the measured value RRO(hp) and a predicted value RROh (hp) for the RRO correction amount of a particular offset position x=x1. In FIG. 11, evaluation value SS is the minimum in offset position BST_x1. Let us assume that the offset position of RRObit arranged at the inner circumference side and the offset position of RRObit arranged at the outer circumference side are equivalent in FIG. 11.

The RRO write unit 63 calculates evaluation value SS in a write permitted range, for example, a range expressed by the formula (16). In a particular servo region, for example, in an even number servo region, the RRO write unit 63 writes RRObit in an offset position x1=BST_x1 which is minimal in calculated evaluation value SS. Here, the offset amount of RRObit arranged at the outer circumference side is equivalent to the offset amount BST_x1 of RRObit arranged at the inner circumference side. Accordingly, the RRO write unit 63 writes RRObit in an offset position x2=−BST_x1 in a particular servo region, for example, an odd number servo region.

Here, the square sum of the difference between the measured value and a predicted value for the RRO correction amount is used as an evaluation value, but RPE within the permitted range may be used as an evaluation value. In this case, the RRO write unit 63 alternately arranges RRObits in the outer circumference sides and inner circumference sides within the permitted range, and evaluates RPE. Based on the evaluation result of RPE, the RRO write unit 63 acquires as optimal offset position a position where the average of RPE is minimal at each of the outer circumference side and the inner circumference side.

In the above-mentioned example, the optimal offset position of one servo region is determined, but it is possible to determine the optimal offset position for each and every servo region in a data track.

When the RRO correction data of all the servo regions of the first embodiment can be read, the position correction unit 64 of the present embodiment executes correction of a head position as the example of FIG. 7 does with reference to the RRO correction amount of the position, where the head 15 is positioned, and the first RRO correction data offset position or the second RRO correction data offset position. Furthermore, in the embodiment, the position correction unit 64 may calculate only the RRO correction amount of the range extending from the target center to an upper limit in a direction where the head 15 deviates (0≤|x|≤DOL).

Figure 12:
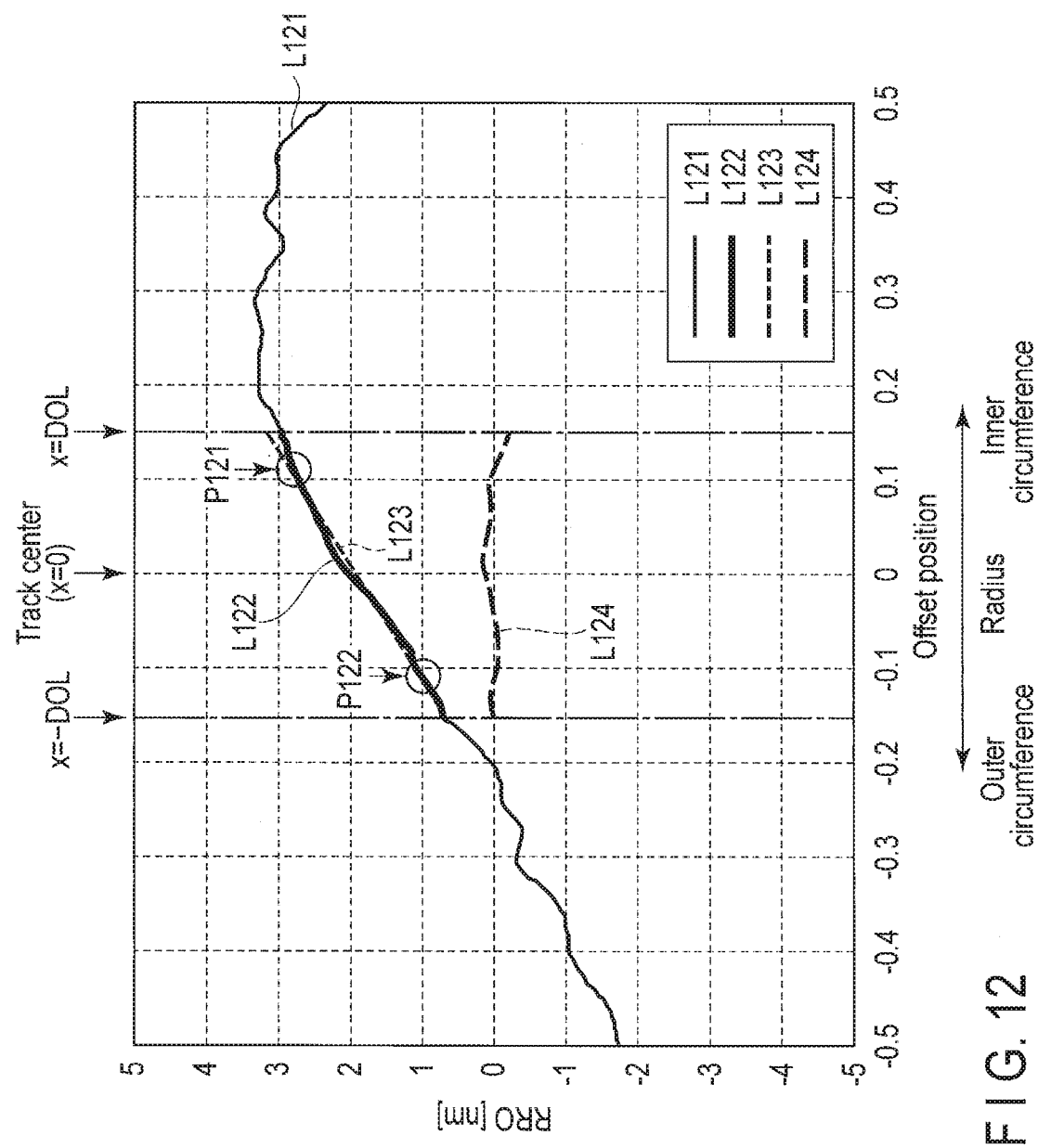
FIG. 12 is a view illustrating an exemplary relation between a head positioning position and an RRO correction amount when RRO correction data is written in an optimal offset position.

FIG. 12 is a view illustrating an exemplary relation between a position, where the head 15 is positioned, and an RRO correction amount when RRO correction data is written in an optimal offset position of a specified servo region. In FIG. 12, P121 is first RRO correction data written in the optimal offset position within the limits and filling the upper limit DOL of the inner circumference side. P122 is second RRO correction data written in the optimal offset position within the limits and filling the upper limit DOL of the side of an outer circumference. L121 illustrates measured value distribution measured along a radius of the disk 10. L122 illustrates measured value distribution of the RRO correction amount within the permitted range. L123 illustrates predicted value distribution of the RRO correction amount. L124 illustrates difference value distribution between measured value distribution of the RRO correction amount and predicted value distribution of the RRO correction amount.

The position correction unit 64 calculates a predicted value from the first RRO correction data and the second RRO correction data, both being arranged in their respective optimal offset positions, and calculates an RRO correction amount for a position, where the head 15 is positioned, with reference to the predicted value distribution and the position where the head 15 is positioned. The position correction unit 64 corrects a head position with reference to the calculated RRO correction amount for the position, where the head 15 is positioned, and either the offset position of the read first RRO correction data or the offset position of the read second RRO correction data.

The difference value distribution L124 illustrated in FIG. 12 indicates that the predicted value distribution L123 is almost equivalent to the measured value distribution L122 of the RRO correction amount.

Accordingly, the position correction unit 64 can appropriately correct a head position with the use of the predicted value distribution calculated from the first RRO correction data and the second RRO correction data which are arranged in the optimal offset position.

FIG. 13 is a view illustrating an exemplary offset RPE profile constituting the structure of RRObit in the present embodiment. FIG. 13 illustrates offset RPE profile RPE1 of a comparative example, in which RRObit is arranged only to each servo region of the target center of a particular track (hereafter referred to as the offset RPE profile of the comparative example), and offset RPE profile RPE2 of the embodiment, in which the structure of RRObits is formed. Here, a data track pitch is set to DataTp. In FIG. 13, the offset position of RRObit arranged at the inner circumference side is x1=0.1DataTp. The offset position of RRObit arranged at the outer circumference side is x2=−0.1DataTp. The upper limit DOL of the permitted range is 0.15DataTp. Reproduction width RRO_Rw is 0.9DataTP.

As illustrated in FIG. 13, since RRObit is not arranged in the target center, RPE of the target center of offset RPE profile RPE2 is slightly larger than RPE of the center position of offset RPE profile RPE1 of a comparative example within the permitted range, but RPE in the offset position of offset RPE profile RPE2 improves in comparison with RPE in the offset position of offset RPE profile RPE1 of the comparative example.

The magnetic disk drive 1 in the present embodiment comprises a disk 10 which has tracks, each having servo regions. Each of the servo regions comprises an outer circumference side and an inner circumference side. Each of the outer circumference side and the inner circumference side has a particular offset position where RRO correction data is held. The offset position of RRO correction data is set within a range which is defined in a permitted range and allows the head 15 to read RRO correction data.

Moreover, the magnetic disk drive 1 calculates an evaluation value from correction-errors distribution of values of offset positions of measured value distribution and predicted value distribution of RRO correction data, acquires as an optimal offset position a position which is the smallest in evaluation value, and writes RRO correction data in the optimal offset position. The magnetic disk drive 1 uses the RRO correction data written in the optimal position, and executes correction of a head position. As a result, the magnetic disk drive 1 can more improve RPE when the head 15 deviates in comparison with the case of the above-mentioned embodiment.

Similar to the second embodiment, the first embodiment makes it possible for the magnetic disk drive 1 to acquire the optimal offset position and to write RRO correction data in the optimal offset position. In this case, the magnetic disk drive 1 reads the RRO correction data written in the optimal offset position, and corrects a head position appropriately. In the above-mentioned embodiment, RRObits are arranged for use in write process. However, when the head 15 can read RRObits, which are arranged as illustrated in any of the above-mentioned embodiments, at the time of read process, the RRO correction data of RRObits may be used for the RRO correction executed at the time of read process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
    a disk comprising tracks, each comprising a track center and servo sectors;
    a head configured to write data to the disk and read data from the disk; and
    a controller configured to acquire first correction data for repeatable runout occurring at one of the tracks and deviating from the track center in a first direction, and second correction data for repeatable runout different from the first correction data, to write the first correction data within a first permitted range including the track center and extending from the track center in the first direction, to write the second correction data within a write permitted range including the first permitted range and a second permitted range including the track center and extending from the track center in a second direction opposite to the first direction, to read at least one of the first correction data and the second correction data, and to correctly place the head within the write permitted range.

2. The magnetic disk drive of claim 1, wherein the controller writes the first correction data in a first servo sector among the servo sectors, writes the second correction data in a second servo sector different form the first servo sector, acquires from the track center the second correction data relative to the second direction, writes the second correction data in the second servo sector adjacent to the first servo sector in the track within the second permitted range, writes the first correction data so as to arrange within the first permitted range the center position of the first read width of the first correction data capable of being read by the head, and writes the second correction data so as to arrange within the second permitted range the center position of the second read width of the second correction data capable of being read by the head.

3. The magnetic disk drive of claim 2, wherein the controller causes the head to readably write in the first permitted range the first correction data comprising the first read width larger than the first permitted range, and causes the head to readably write in the second permitted range the second data range comprising the second read range larger than the second permitted range.

4. The magnetic disk drive of claim 3, wherein the controller writes the first correction data so as to arrange the center position of the first read width in a first region from the track center to a position corresponding to a value half of the first read width within the first permitted range, and writes the second correction data so as to arrange the center position of the second read width in the second region from the track center to a position corresponding to a value half of the second read width within the second permitted range.

5. The magnetic disk drive of claim 4, wherein the controller calculates correction errors from difference between a measured value distribution obtained by measuring correction values for correcting repeatable runouts occurred in the write permitted range and a predicted value distribution of the correction value of the write permitted range calculated from the first correction data and the second correction data, determines the first position of the first region and the second position of the second region by calculating minimum square sum of the respective correction errors, writes the first correction data so as to arrange the center position of the first read width in the first position, and writes the second correction data so as to arrange the center position of the second read width in the second position.

6. The magnetic disk drive of claim 2, wherein the controller causes the head to readably write within the write permitted range the first correction data comprising the first read width larger than the write permitted range, and causes the head to readably write within the write permitted range the second correction data comprising the second read width larger than the write permitted range.

7. The magnetic disk drive of claim 6, wherein the controller calculates a first difference value between the value of half the size of the first read width and the value of the size of the first permitted range,
    writes the first correction data so as to locate the center position of the first read width within a third region which is within the first permitted range and extends from the track center to a position corresponding to the first difference value,
    calculates a second difference value between the value of half the size of the second read width and the value of the size of the second permitted range, and
    writes the second correction data so as to locate the center position of the second read width within a fourth region which is within the first permitted range and extends from the track center to a position corresponding to the second difference value.

8. The magnetic disk drive of claim 7, wherein the controller calculates correction errors from difference between measured value distribution obtained by measuring correction values for correcting repeatable runouts repeatedly occurring in the write permitted range and predicted value distribution of correction values falling into the write permitted range and obtained by calculating the first correction data and the second correction data, obtains a third position of the third region and a fourth position of the fourth region, both making minimum a sum of squares of the correction errors, locates the center position of the first read width on the third position upon writing the first correction data, and locates the center position of the second read width on the fourth position upon writing the second correction data.

9. The magnetic disk drive of claim 2, wherein the controller acquires the first correction data at the fifth position distant from the track center of the first permitted range in the first direction by a first distance, locates the center position of the first read width on the fifth position upon writing the first correction data, acquires the second correction data at the sixth position distant from the track center of the second permitted range in the second direction by the first distance, and locates the center position of the second read width on the sixth position upon writing the second correction data.

10. The magnetic disk drive of claim 1, to acquire the first correction data from the first permitted range extending from the track center in the first direction, and the second correction data from the second permitted range extending from the track center in the second direction opposite, to write the first correction data and second correction data in a servo sector at the track center.

11. A head position correcting method applied to a magnetic disk drive including a disk comprising tracks, each comprising a track center and servo sectors, and a head configured to write data to the disk and read data from the disk, comprising:
  acquiring first correction data for repeatable runout occurring at one of the tracks and deviating from the track center in a first direction, and second correction data for repeatable runout different from the first correction data;
  writing the first correction data within a first permitted range including the track center and extending from the track center in the first direction,
  writing the second correction data within a write permitted range including the first permitted range and a second permitted range including the track center and extending from the track center in a second direction opposite to the first direction;
  reading at least one of the first correction data and the second correction data; and
  makes corrections to locate the head within the write permitted range.

12. The head position correcting method of claim 11, further comprising:
  writing the first correction data in a first servo sector among the servo sectors;
  writing the second correction data in a second servo sector different form the first servo sector;
  acquiring from the track center the second correction data of the second direction;
  writing the second correction data in the second servo sector adjacent to the first servo sector in the track within the second permitted range;
  locating in the first permitted range upon writing the first correction data the center position of the first read width of the first correction data capable of being read by the head; and
  locating in the second permitted range upon writing the second correction data the center position of the second read width of the second correction data capable of being read by the head.

13. The head position correcting method of claim 12, further comprising:
  causing the head to readably write within the first permitted range the first correction data larger in first read width than the first permitted range; and
  causing the head to readably write within the second permitted range the second correction data larger in second read width than the second permitted range.

14. The head position correcting method of claim 13, further comprising:
  writing first correction data so as to locate the center position of the first read width in a first region being within a first permission range and extending from a track center to a position corresponding to the value of half the size of the first read width; and
  writing second correction data so as to locate the center position of the second read width in a second region being within a second permission range and extending from a track center to a position corresponding to the value of half the size of the second read width.

15. The head position correcting method of claim 14, further comprising:
  calculating correction errors from difference between measured value distribution obtained by measuring correction values for correcting repeatable runout within the write permitted range and predicted value distribution of the correction values for correcting the write permitted range and calculated from the first correction data and the second correction data;
  acquiring a first position in the first region and a second position in the second region, each making square sum of correction errors minimal;
  writing the first correction data so as to locate the center position of the first read width in the first position; and
  writing the second correction data so as to locate the center position of the second read width in the second position.

16. The head position correcting method of claim 12, further comprising:
  causing the head to readably write in the write permission range the first correction data comprising larger first read width than the write permission range; and
  causing the head to readably write in the write permission range the second correction data comprising larger second read width than the write permission range.

17. The head position correcting method of claim 16, further comprising:
  calculating a first difference value between a value of half the size of the first read width and a value of the size of the first permission range;
  writing first correction data so as to locate the center position of the first read width in a third region being in the first permitted range and extending from the track center to a position corresponding to the first difference value;
  calculating a second difference value between a value of half the size of the second read width and a value of the size of the second permission range; and
  writing second correction data so as to locate the center position of the second read width in a fourth region being in the second permitted range and extending from the track center to a position corresponding to the second difference value.

18. The head position correcting method of claim 17, further comprising:
  calculating correction errors from difference between measured value distribution obtained by measuring correction values for correcting repeatable runout in the write permission range and predicted value distribution of correction values falling in the write permitted range and calculated from the first correction data and the second correction data;
  acquiring a third position in the third region and a fourth position in the fourth region, each making square sum of correction errors minimal;
  writing the first correction data so as to locate the center position of the first read width in the third position; and
  writing the second correction data so as to locate the center position of the second read width in the fourth position.

19. The head position correcting method of claim 12, further comprising:

acquiring first correction data at a fifth position distant from the track center within the first permitted range by a first distance in the first direction;

writing the first correction data so as to locate the center position of the first read width in the fifth position;

acquiring second correction data at a sixth position distant from the track center within the second permitted range by a first distance in the second direction; and writing the second correction data so as to locate the center position of the second read width in the sixth position.

20. The head position correcting method of claim 11, further comprising:

acquiring the first correction data from the first permitted range extending from the track center in the first direction, and the second correction data from the second permitted range extending from the track center in the second direction, writing the first correction data and second correction data in a servo sector at the track center.

* * * * *